C. F. KETTERING & W. A. CHRYST.
CASH REGISTER.
APPLICATION FILED SEPT. 2, 1908.
1,137,061.
Patented Apr. 27, 1915.
17 SHEETS—SHEET 12.
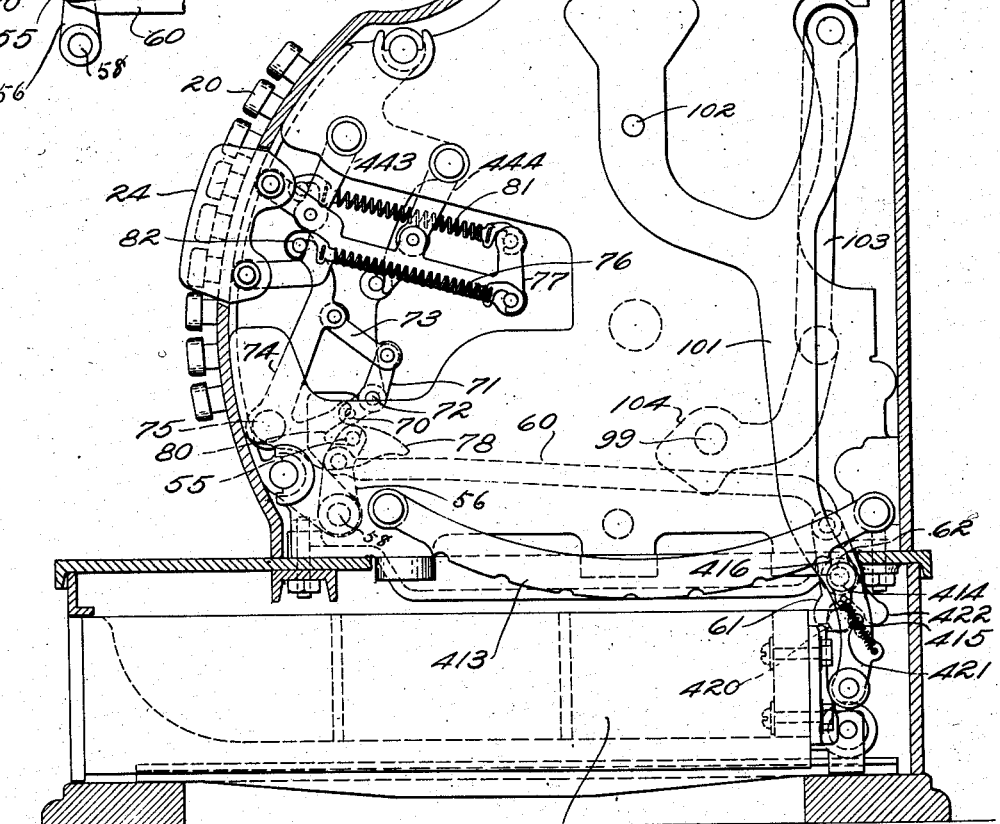

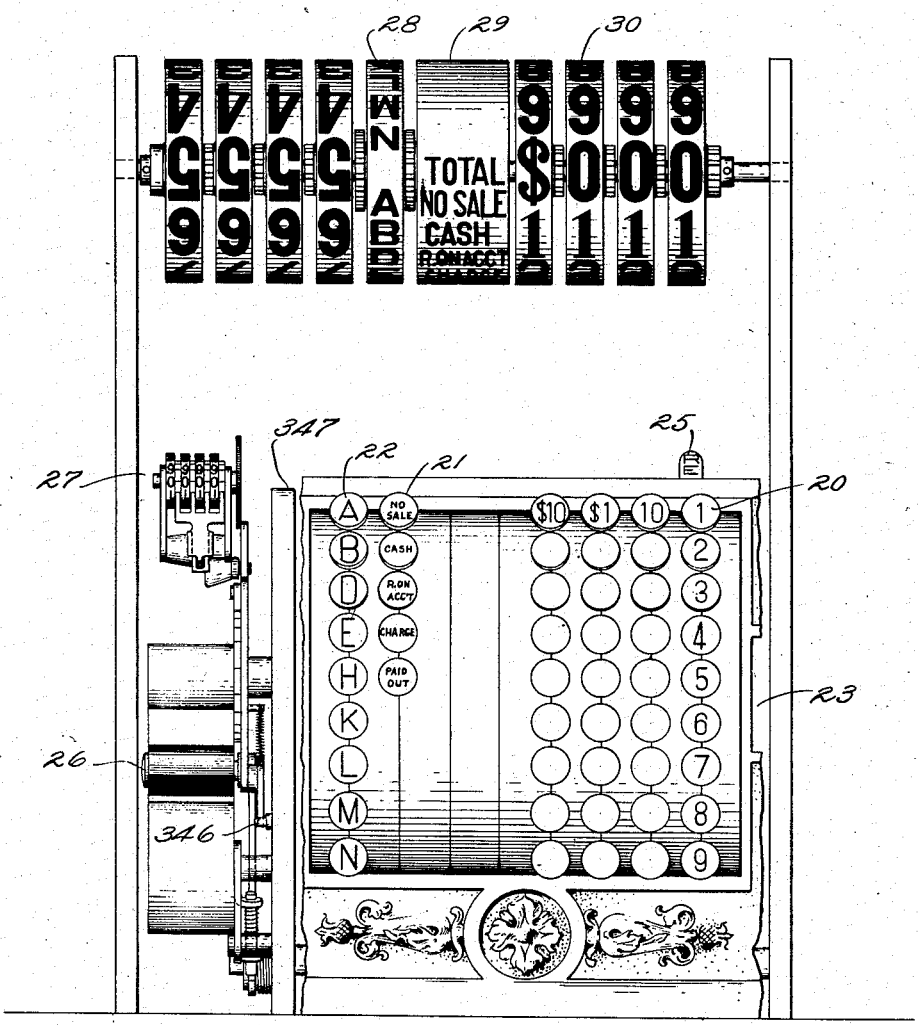

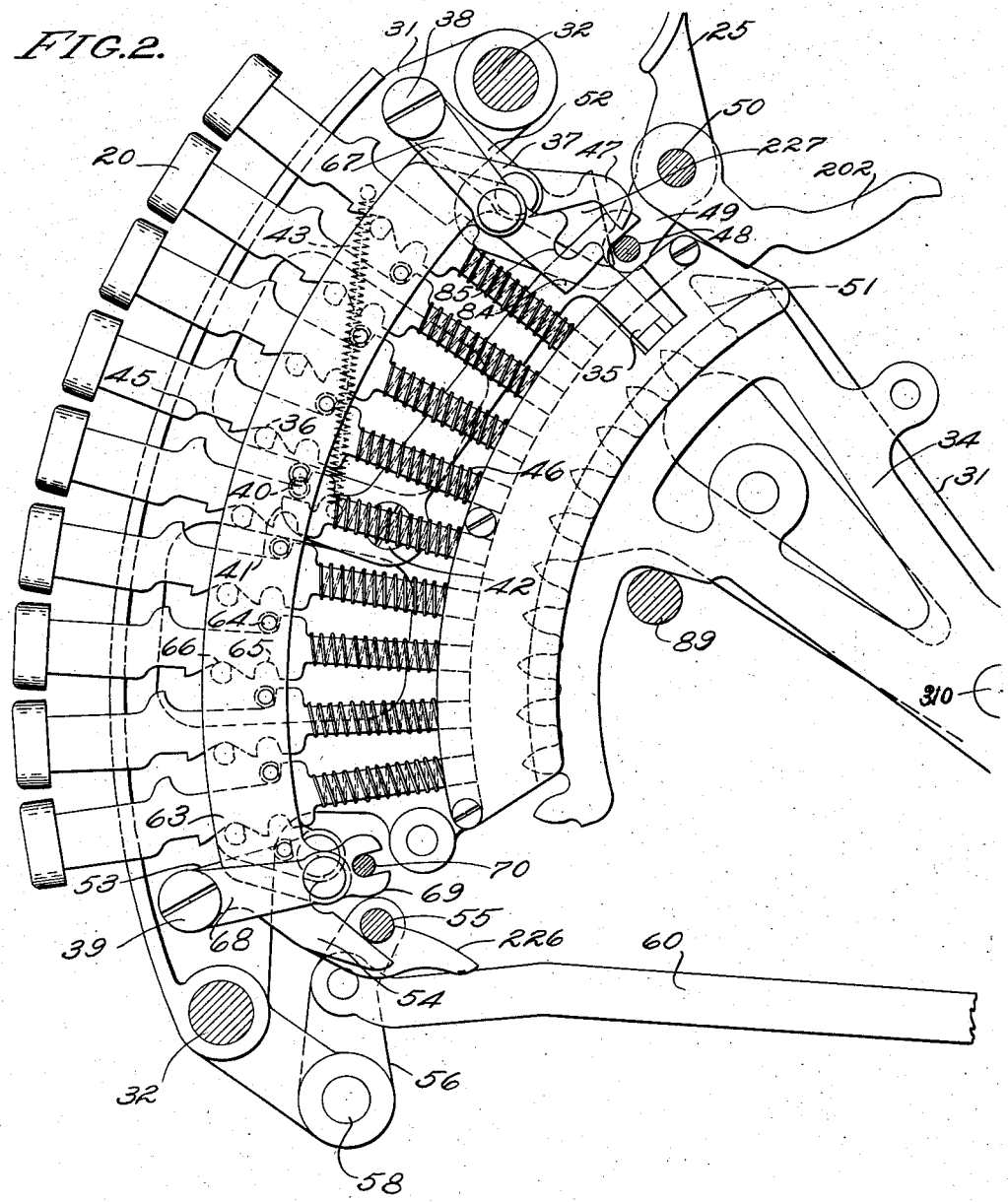

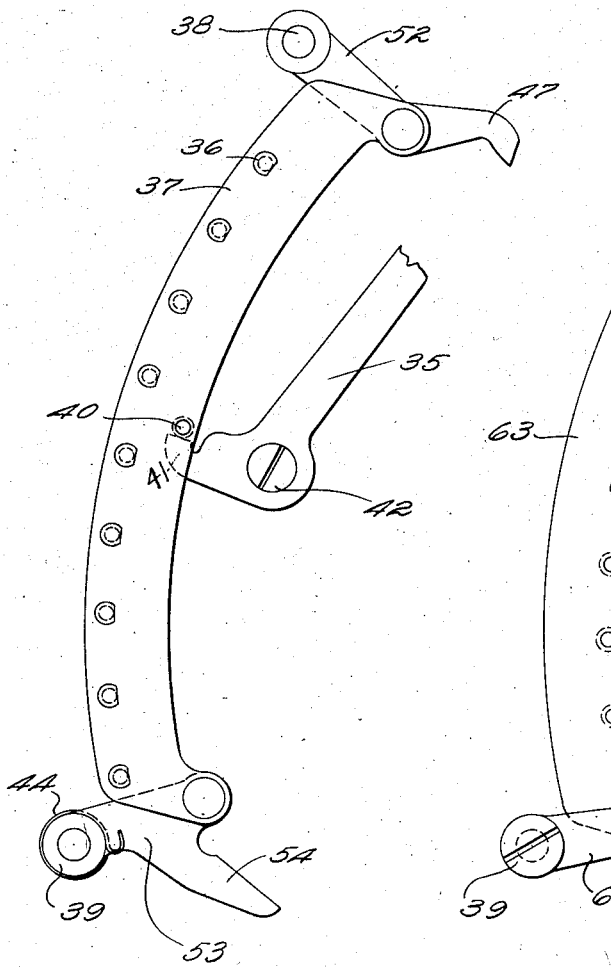
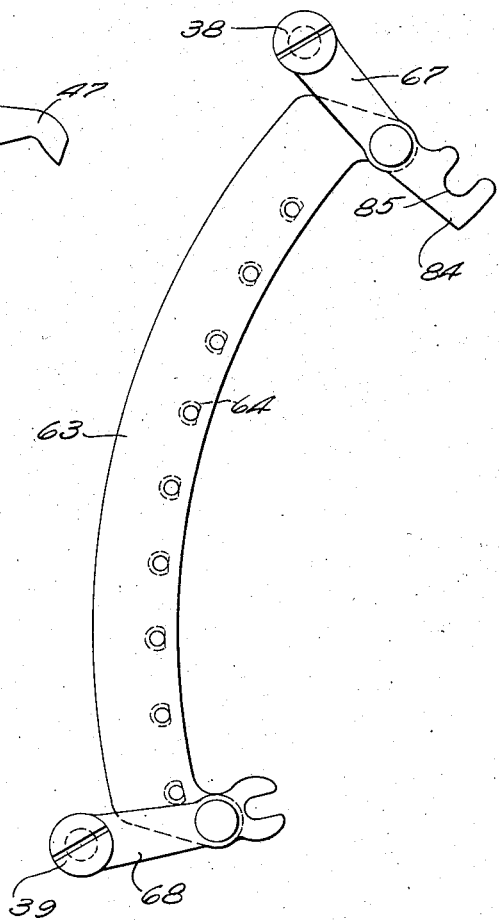

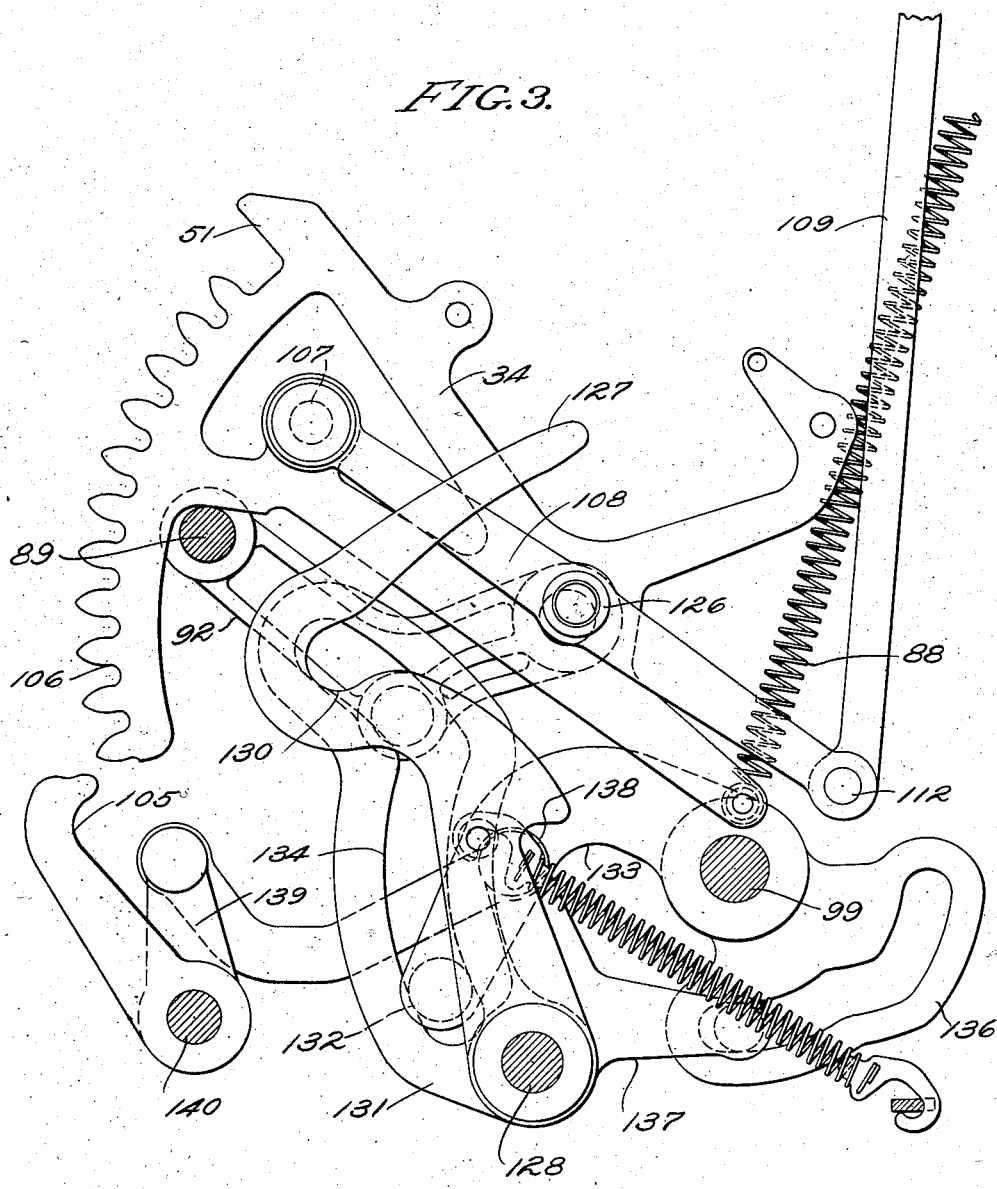

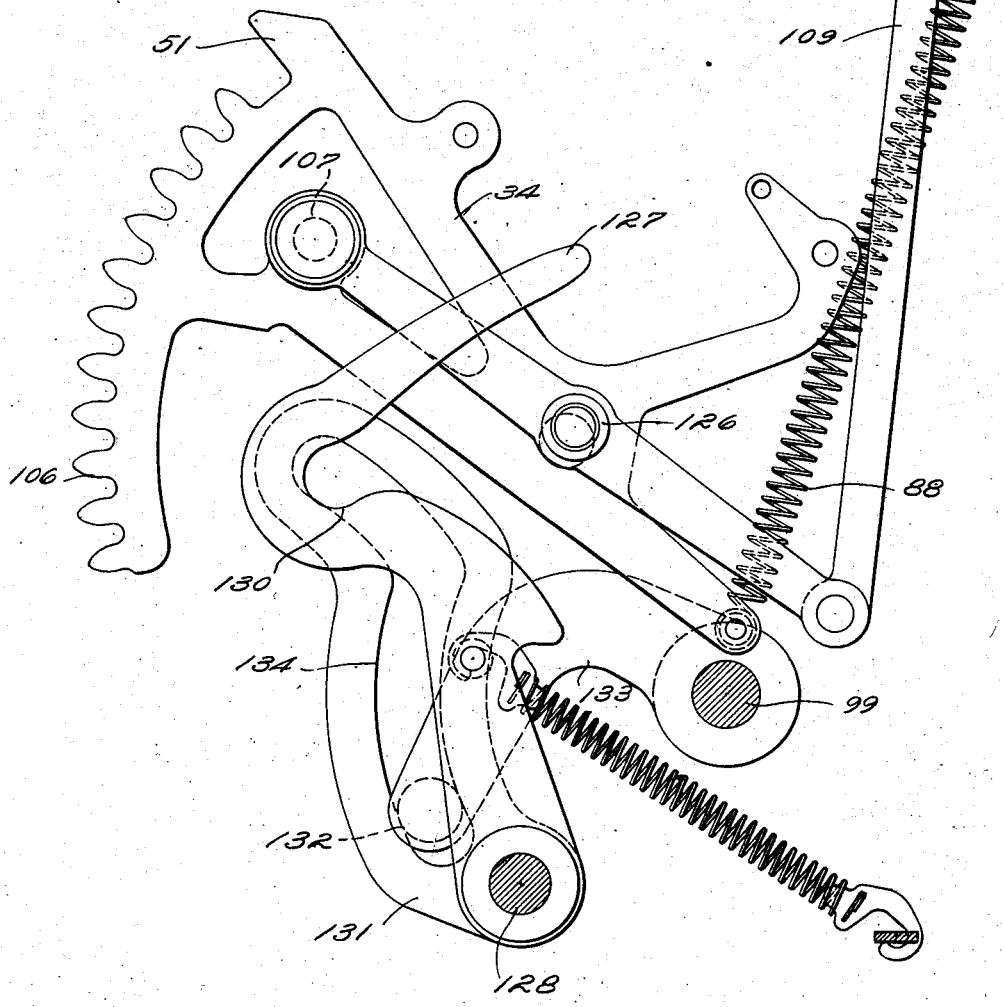

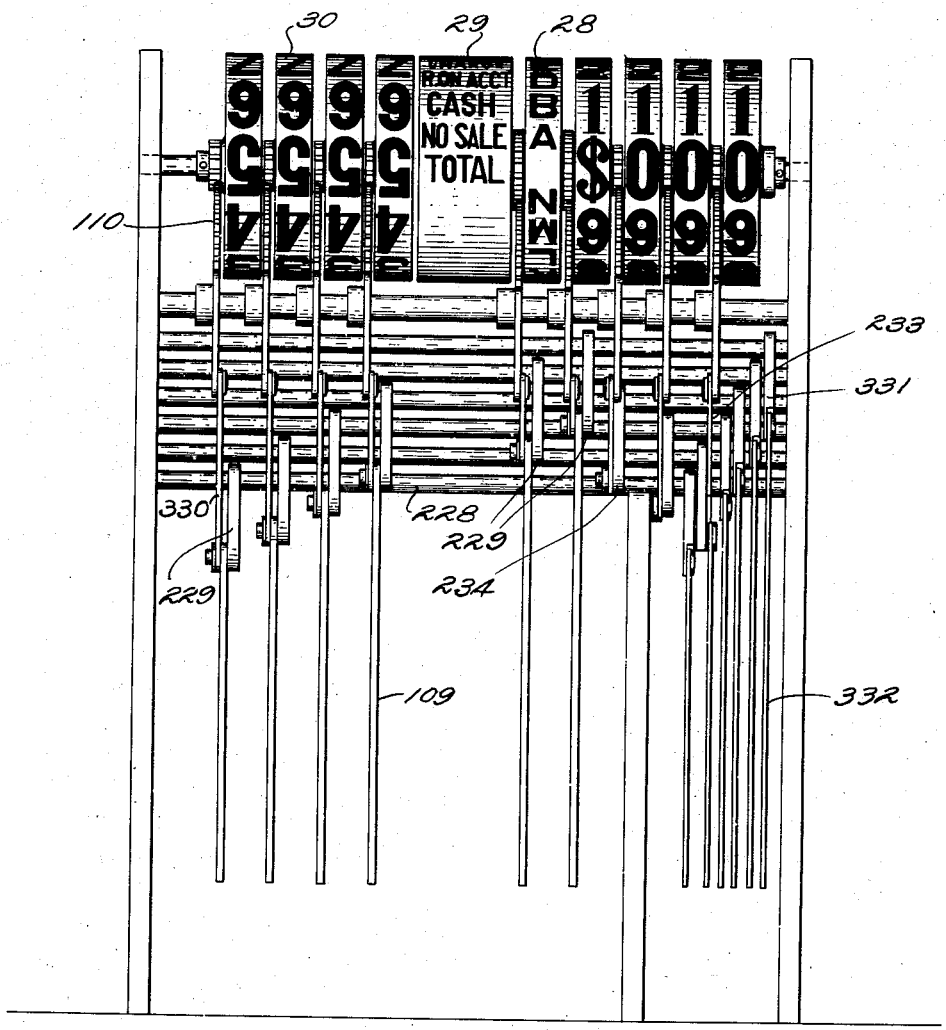

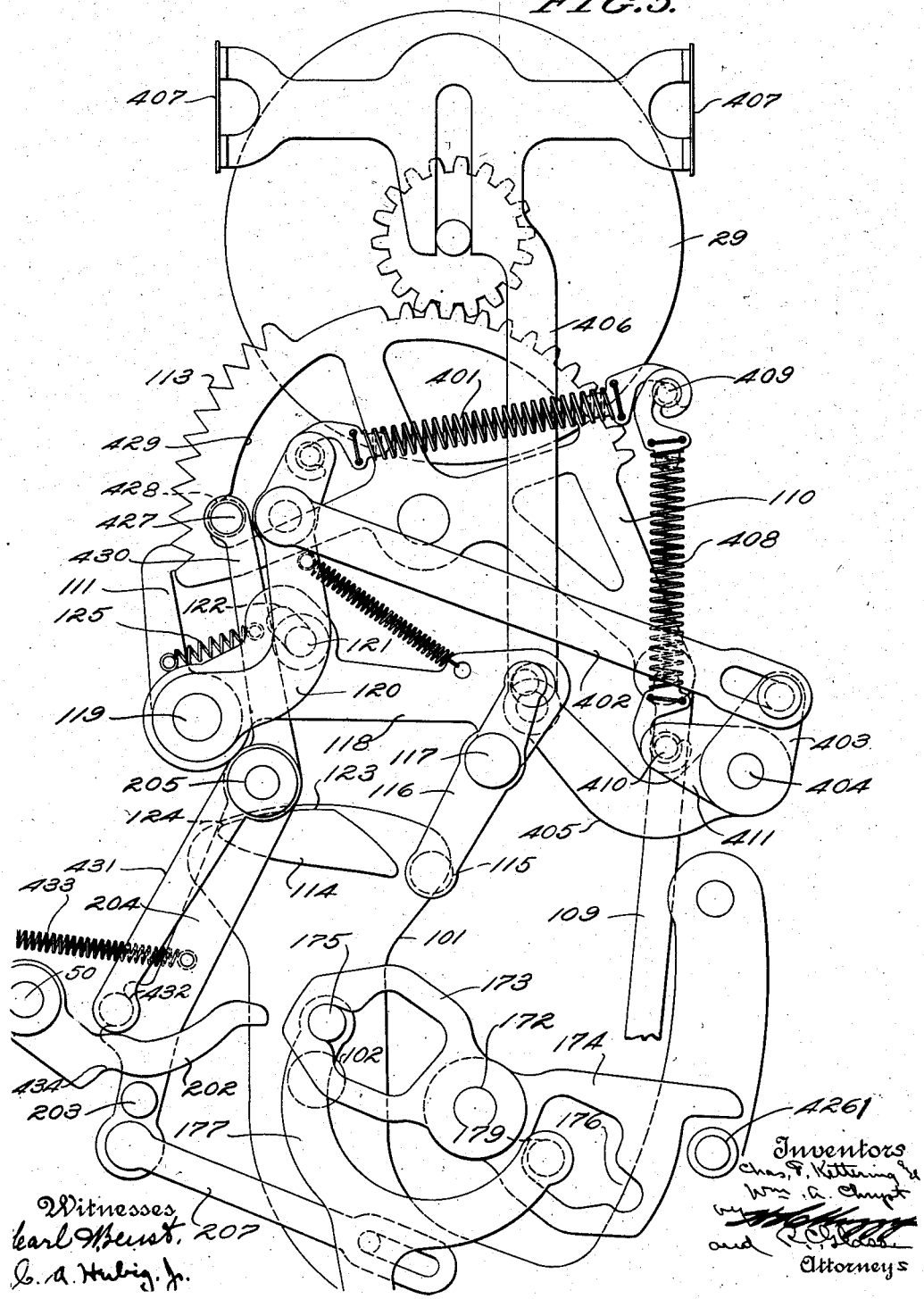

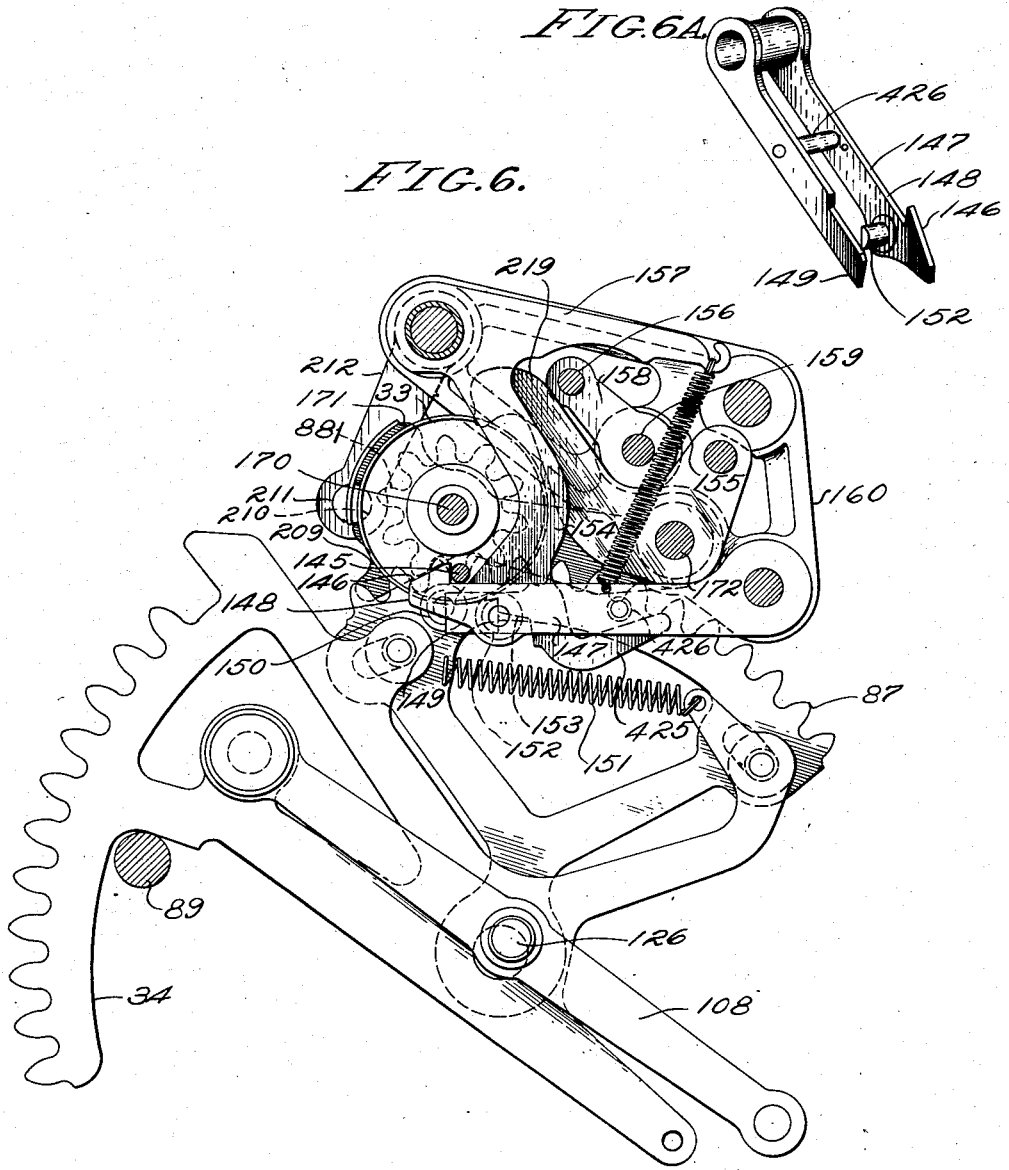

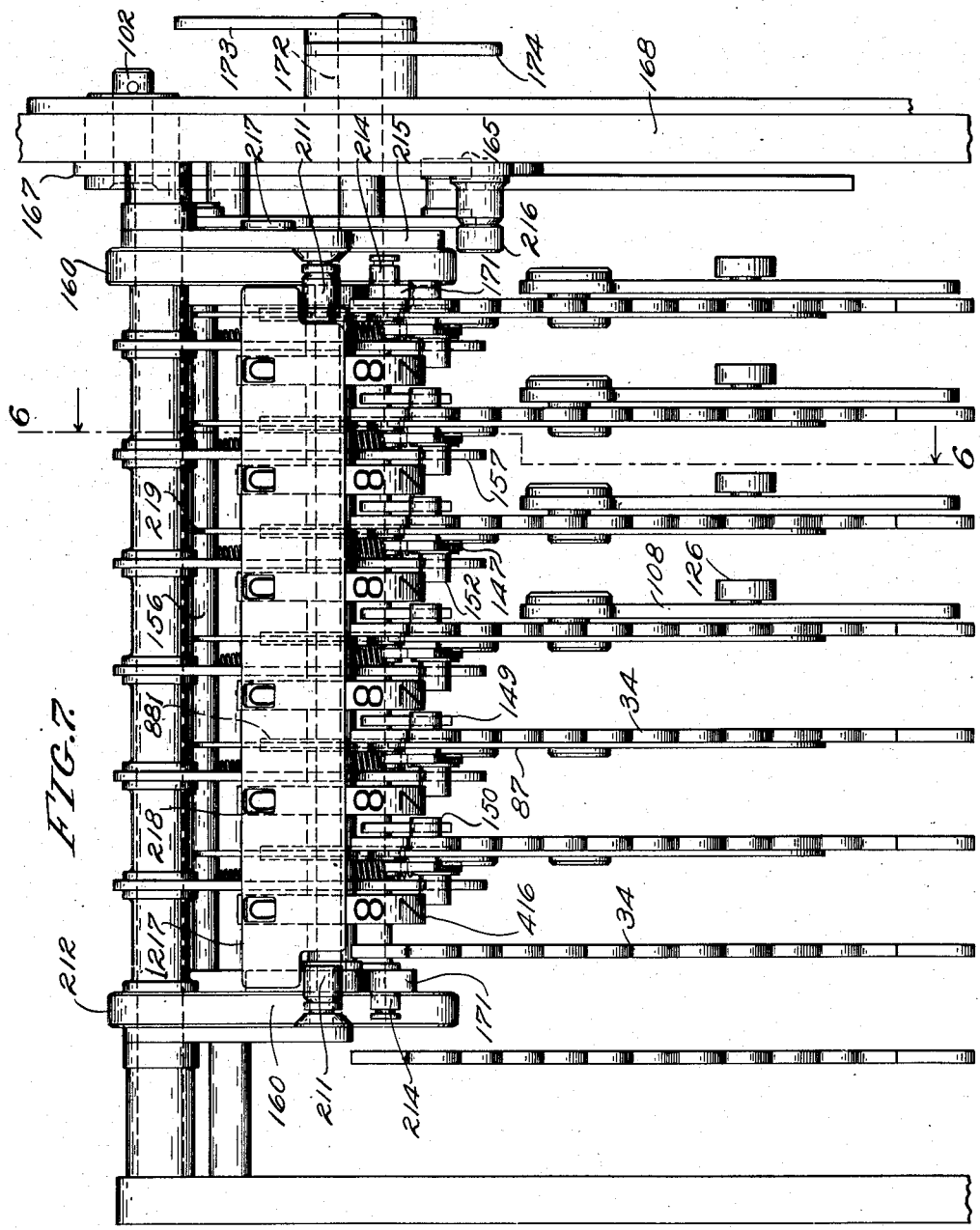

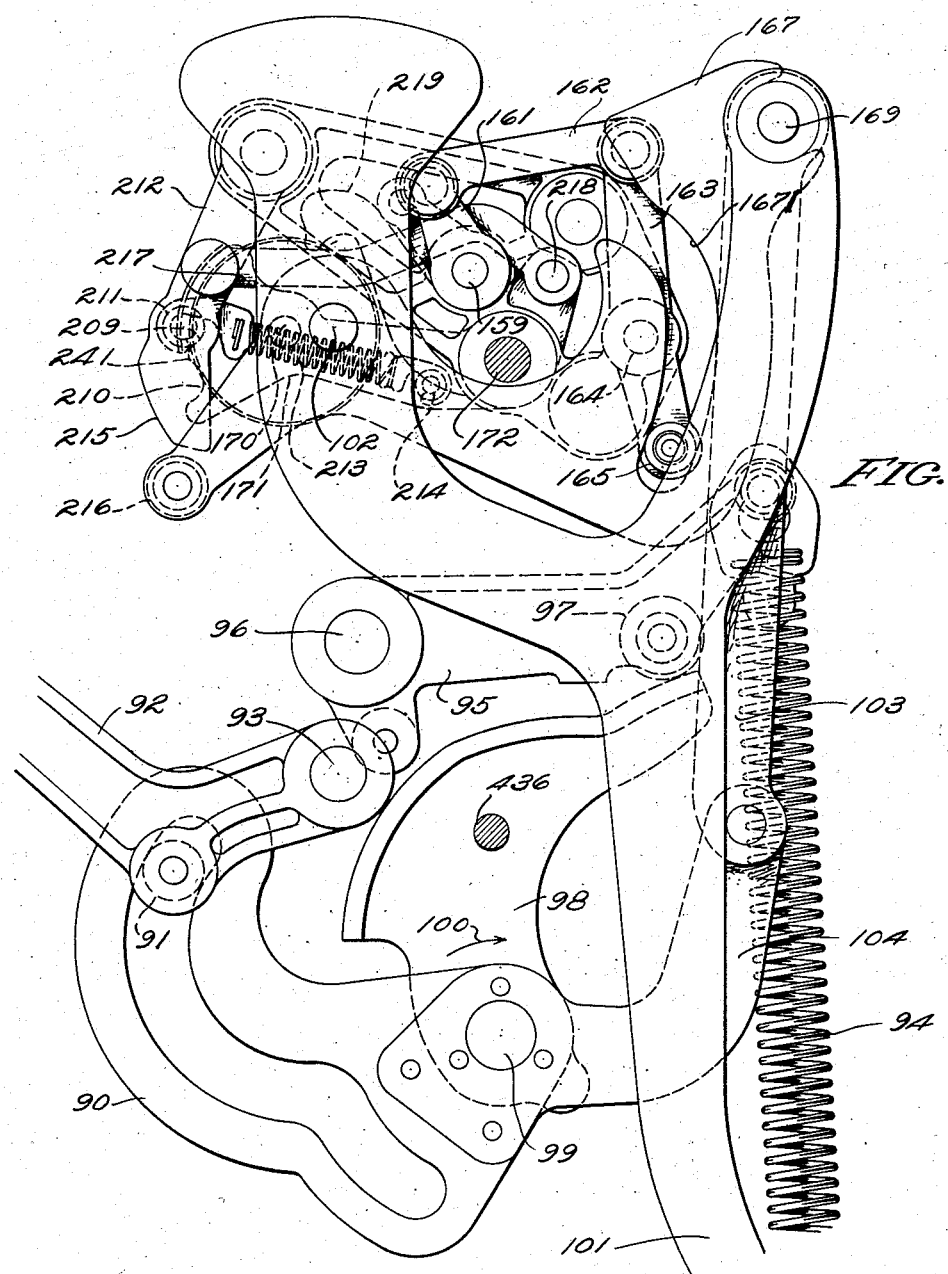

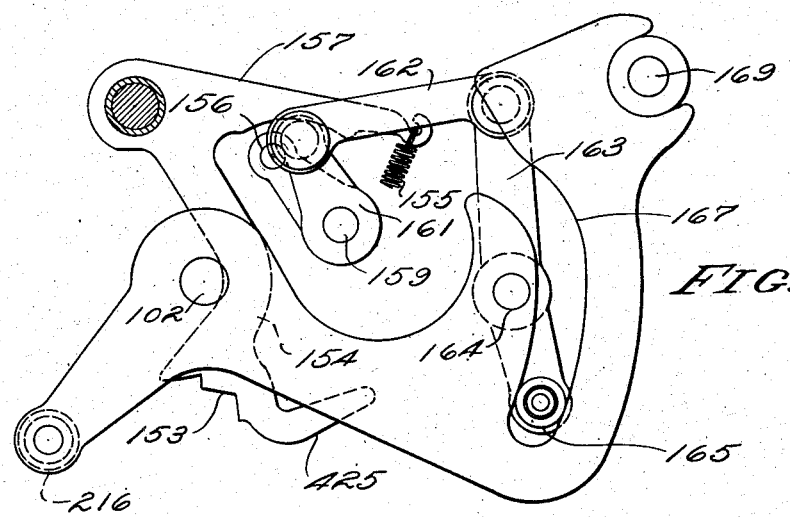
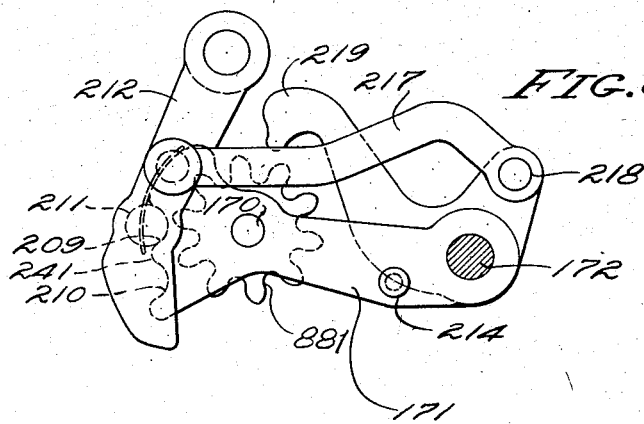

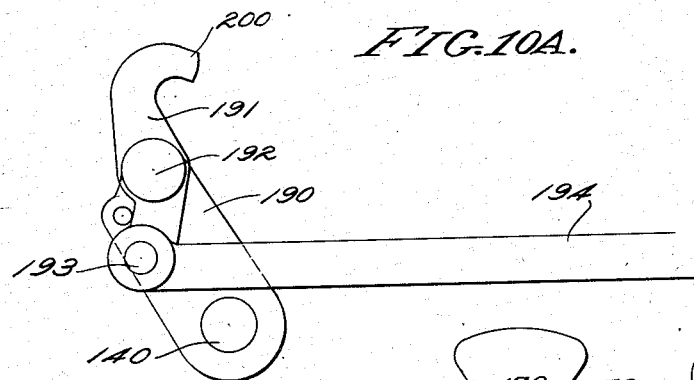
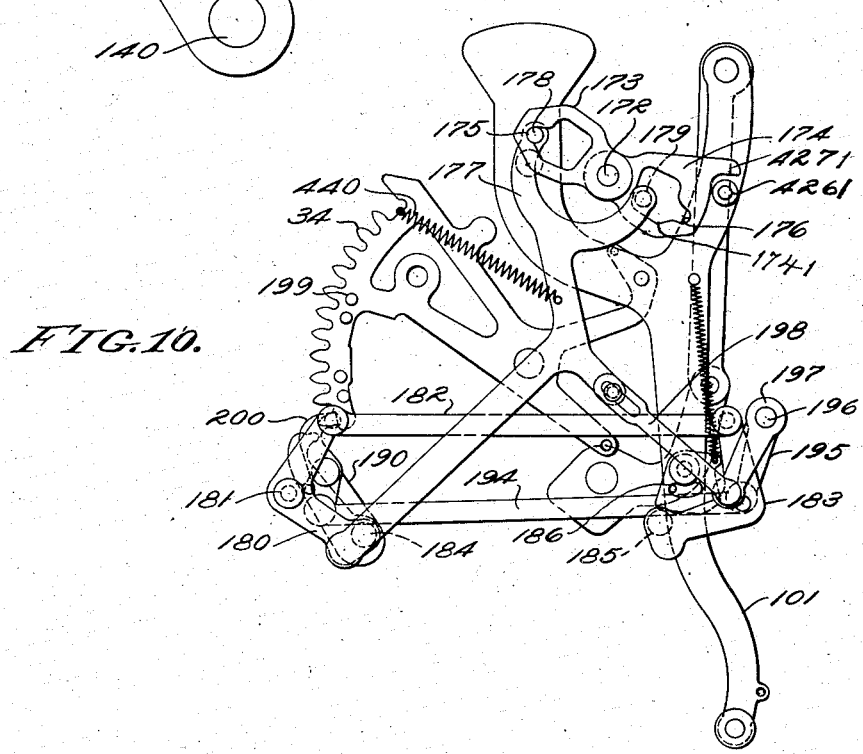

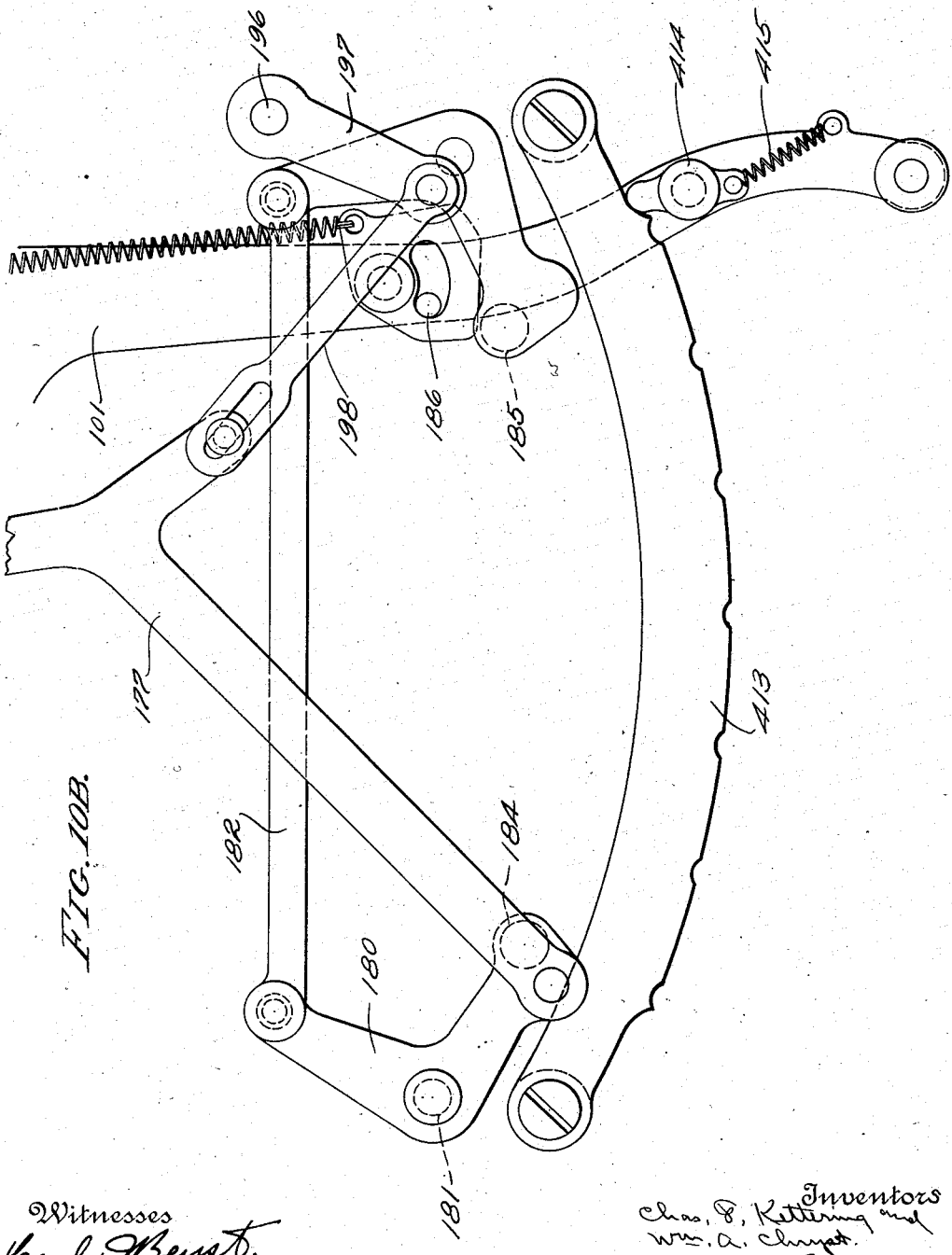

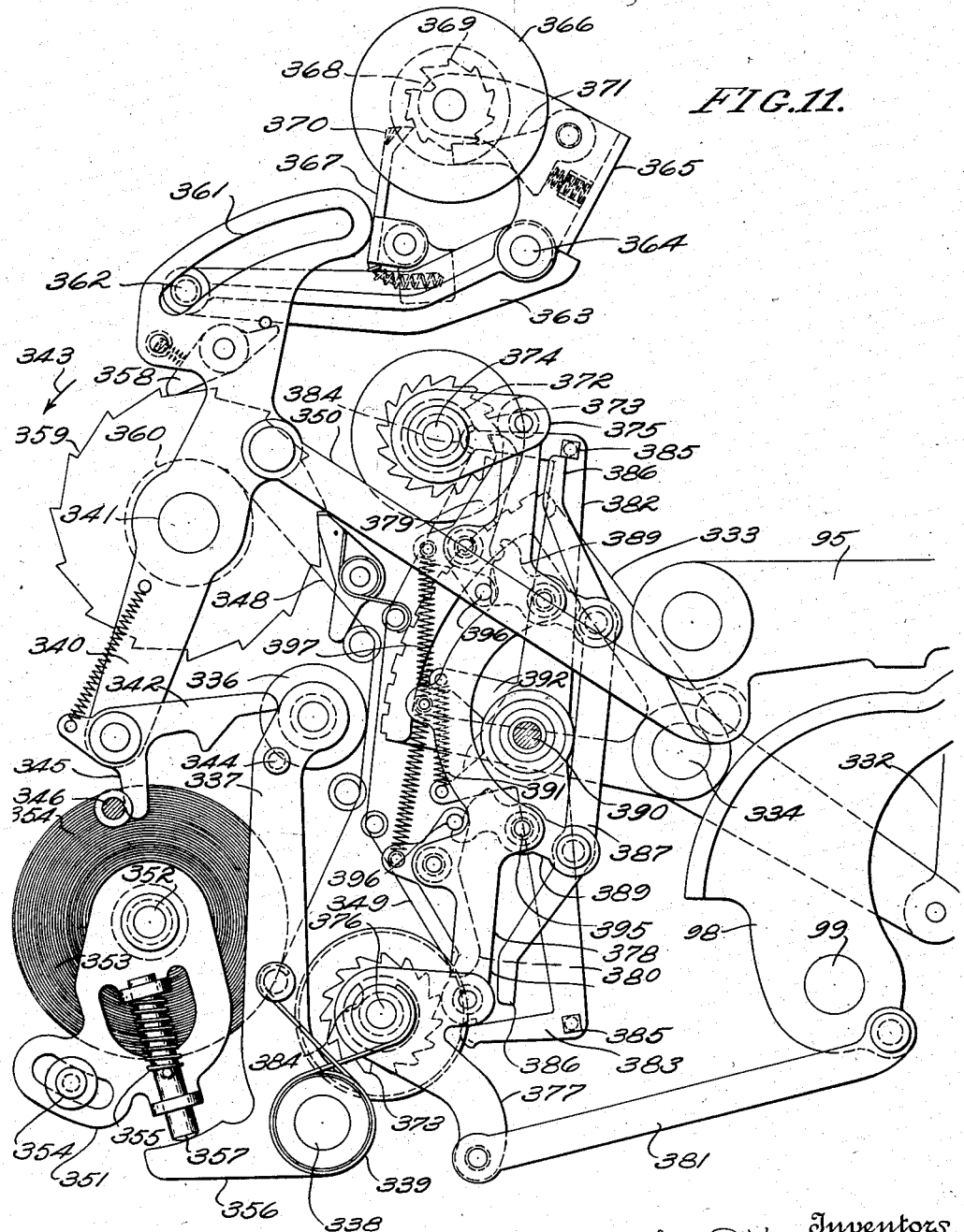

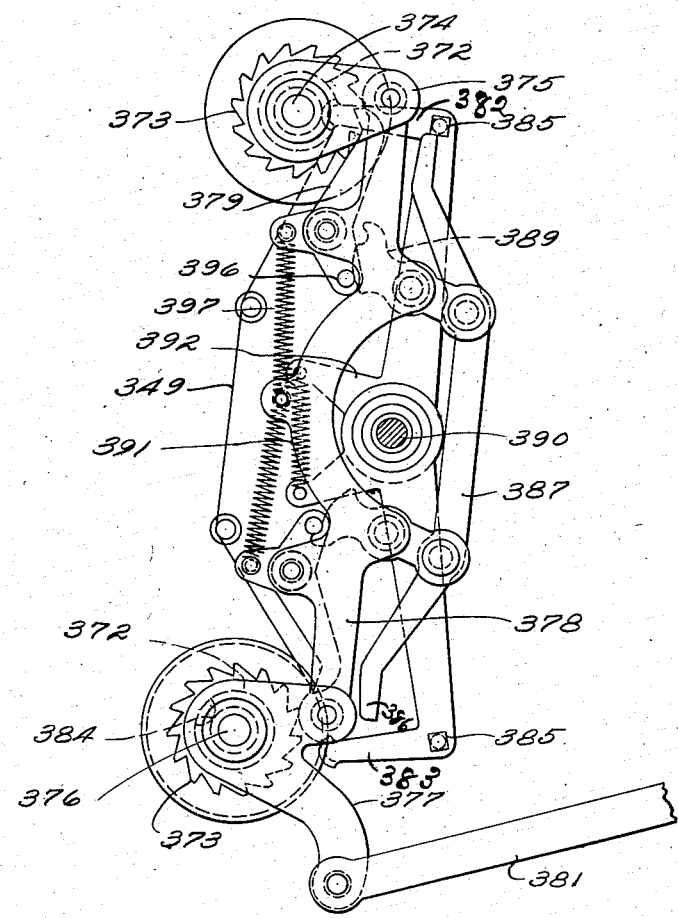

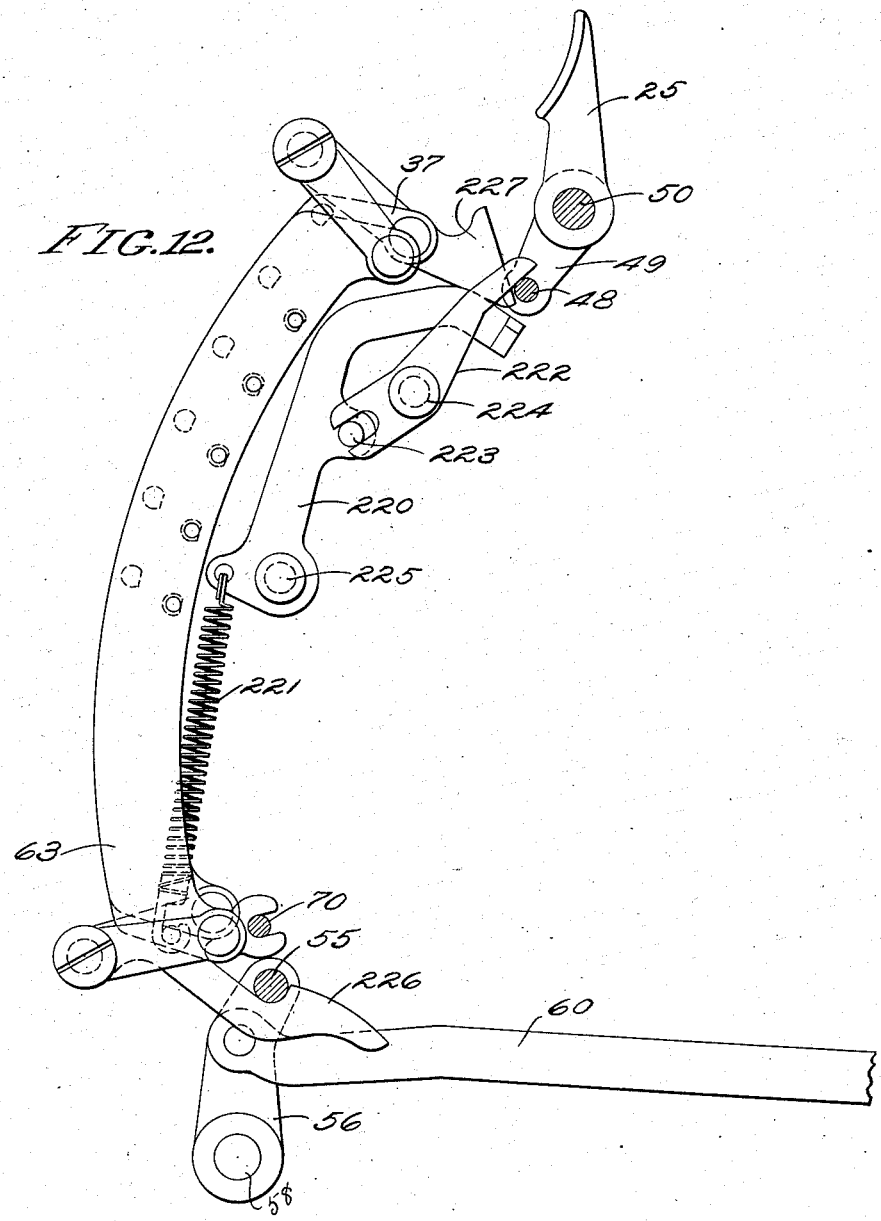

UNITED STATES PATENT OFFICE.

CHARLES F. KETTERING AND WILLIAM A. CHRYST, OF DAYTON, OHIO, ASSIGNORS TO THE NATIONAL CASH REGISTER COMPANY, OF DAYTON, OHIO, A CORPORATION OF OHIO, (INCORPORATED IN 1906.)

CASH-REGISTER.

1,137,061. Specification of Letters Patent. Patented Apr. 27, 1915.

Application filed September 2, 1908. Serial No. 451,446.

*To all whom it may concern:*

Be it known that we, CHARLES F. KETTERING and WILLIAM A. CHRYST, citizens of the United States, residing at Dayton, in the county of Montgomery and State of Ohio, have invented certain new and useful Improvements in Cash-Registers, of which we declare the following to be a full, clear, and exact description.

This invention relates to cash registers.

One of its principal objects is to produce a cash register of such construction that if desired its capacity may be increased to any amount by the mere addition of duplicate key banks and denominational elements controlled thereby.

Another object is to provide a key bank construction and differential mechanism controlled thereby all mounted together in a single unit, one such unit being serviceable in any denominational element of the totalizer so that any desired number of the units may be inserted into the machine in any order or position, the relative position in which they are inserted into the machine determining the denominational value of each bank.

Another object is to provide a drawer operated cash register in which the leverage of the drawer is so proportioned that the machine may be as easily operated as a crank operated machine in which the crank is caused to make two revolutions at each operation.

Another object is to regulate the closing of the cash drawer so that if a power which is sufficient to start the drawer is uniformly applied during the closing movement the speed will gradually be accelerated so as to insure that at the end of the movement the drawer will travel with such force as to pass its normal inner position which extra movement effects the release of the keys.

Another object is to provide such construction that nearly all of the operating parts may be punched from sheet metal and need very little machine work.

Another object is to provide an improved ink ribbon feeding device for the printer.

A further object is to provide a construction requiring a depression of certain identifying keys and a main release key before the mechanism may be finally released. By assigning special keys to the operators or departments or both, it is possible to compel the machine operator to identify any transaction with both its department and its operator before the mechanism may be released, without providing any interlocks to compel depression of keys in a certain serial order.

Another object is to provide a construction wherein the printer and the indicating mechanism are set directly from one position to another and without any possibility of rebound.

Another object is to provide an improved lock for the keys controlled by the main release key whereby when the release key is depressed no other key may thereafter be actuated.

Another object is to provide an improved construction for printing totals from the totalizer, and for locking the total key by the amount keys and the reverse.

Additional objects are to provide an improved drawer releasing mechanism requiring very little force and putting little strain on the mechanism, and an improved construction for a so-called throw-out counter. This throw-out counter device is designed to be adjustable so as to prevent actuation of the totalizer in connection with any desired special keys.

With these and incidental objects in view, the invention consists in certain novel features of construction and combinations of parts, the essential elements of which are set forth in appended claims and a preferred form of embodiment of which is hereinafter described with reference to the drawings which accompany and form part of the specification.

Of said drawings: Figure 1 is a front elevation of a cash register constituting the present invention. The cabinet and part of the interior mechanism being omitted for the sake of clearness. Fig. 2 is a side elevation of one of the key sections showing one bank of keys. Fig. 2ᴬ is a detail of the key detent, one of which is provided for each bank of keys. Fig. 2ᴮ is a detail of the key locking device, one of which is also provided for each bank. Fig. 3 is a side elevation of one section of the differential mechanism and the indicator setting device which is controlled thereby. Fig. 3ᴬ is a side elevation of the indicator setting device. Fig. 4 is a rear elevation of the indicators and their connections with the differential mechanism. This view also shows the connections between the differential mechanism and the type carriers. Fig. 5 is a side elevation of the indicators and the operating mechanism for the same. Fig. 6 is a sectional view of the totalizer on the line 6—6 of Fig. 7. Fig. 6ᴬ is a perspective view of one of the transfer pawls of the totalizer. Fig. 7 is a front elevation of the totalizer or adding device. Fig. 8 is a side elevation of the main driving mechanism including the main motor spring and one of the pivoted drawer operating arms. This view also shows a side elevation of the totalizer. The side frame is omitted. Fig. 8ᴬ is a detail of a cam shown in Fig. 8, and the parts operated thereby. Fig. 8ᴮ is a detail of one of the totalizer pinion alining devices. Fig. 9 is a right end elevation of the machine with the cabinet in section. Fig. 9ᴬ is a detail of the drawer latch. Fig. 9ᴮ is a detail of part of the operating mechanism of the drawer latch. Fig. 10 is a side elevation of one of the drawer operated arms and the mechanism which is used for shifting the totalizer into and out of mesh with the differential segments at the required times for the purpose of adding amounts to the totalizer and for causing a so-called "throw-out" operation of the totalizer. Fig. 10ᴬ is a detail of a device for preventing the totalizer from being moved into mesh with the actuating racks when the machine is operated to record a charged amount or other transactions of such nature where it is desired not to add the amount upon the totalizer. Fig. 10ᴮ is a detail of part of the totalizer shifting mechanism. Fig. 11 is a side elevation of the printing mechanism looking toward the left of Fig. 1. Fig. 11ᴬ is a detail of the ink ribbon reversing mechanism as shown in Fig. 11 but separated therefrom more clearly to illustrate the same. Fig. 12 is a side elevation of the key detents of one of the special banks of keys. This view also shows the resetting key and its control of the zero stop for said bank.

In a prior pending application, Serial No. 427,441 filed by C. F. Kettering and W. A. Chryst on April 16, 1908, a machine is shown having in certain respects, the same general principle of operation, as that of the machine shown and described herein. It will, therefore, be understood, that the present invention is an improvement on the earlier one, and that all claims to subject matter common to the two cases are intended to be placed in the earlier application.

The general principle of this machine is as follows: The different banks of keys control the extents of movement of their individual totalizer segments, which segments are forwardly driven by means of springs to such positions as are determined by depressed keys. The segments are returned to their initial positions by a rocking frame which extends in under all of the segments and is pivoted to stub shafts which are in alinement with the pivots of the segments. This frame is rocked upwardly so as to return the segments upon the closing of the cash drawer. The totalizer is caused to be meshed with the segments when the same are in their lowered positions so that upon the return of the segments the extent of upward movement of the segments will be imparted to the totalizer so that the desired amount will be added to the totalizer.

The segment gears which rotate the indicators are controlled by the corresponding totalizer segments by means of a pair of links which are pivoted together at their ends and have their opposite ends respectively pivoted to the indicator operating segments and totalizer segments. Indicator alining devices are provided which serve to lock the indicators against rotation while the totalizer segments are being actuated and alining devices are provided which lock the totalizer segments when the same are at rest in their lower positions. When the totalizer segments are locked, the indicator alining devices are caused to release the indicator segments. One of the before mentioned links or rather beams which is pivoted to the totalizer segment carries a roll which is moved to a certain definite position in a direction depending on its previous setting and the extent of forward movement of the totalizer segment. The said beam at this time merely rocks upon its pivotal connection with the other beam, as during the forward movement of the segment the indicators are locked against movement. But when the totalizer segments reach their forward positions the indicators are released and the totalizer segments are locked in such positions. At this time a V-shaped cam is caused to engage the roller on the beam which is pivoted to the totalizer segment and return the roller to its initial position, thereby through the link connection mentioned adjusting the indicator operating segment and moving the indicator from the position in which it was left at the end of the preceding operation directly to the new position. The indicator alining device is then thrown into engagement to lock the indicator, after which the V shaped cam is moved out of engagement with the roller on the indicator beam. The beam is then oppositely rocked and so causes the actuation of the indicator segment in accordance to the actuation of the totalizer segment. By these means the totalizer segments are free to return to their zero positions without affecting the positions of the indicators and besides the indicators may be rotated directly from one position to another without being first returned to zero positions.

Locking devices are provided which will prevent the release of the cash drawer unless one of the initial keys and also one of the special keys which indicate the nature of the transaction are depressed. All of the keys in these two banks control the printer so that the printer will print the identifying initial of the operator and also the nature of the transaction, as, Received on Account, Charged, &c.

The totalizer may be reset by the depression of a resetting key and the drawer release key provided none of the amount keys or transaction keys are depressed.

The locking devices between the different banks of keys serve to make the drawer release key inoperative unless the same is depressed in combination with either one of the initial keys and one of the special keys or else with the resetting key. If any proper combination of keys is depressed, the machine may be then completely operated by permitting the cash drawer to be fully opened and closed before different keys can be depressed. This is accomplished by the special forms of key detents and a full stroke device operating in conjunction with the drawer operating arms, (all of which will be described in detail). The printer is constructed, so that the same will operate to print a complete record of each operation of the machine, printing the operator's identifying initial also one or the other of the special characters and the amount involved, or the operator's identifying initial and total amount which has been added to the totalizer, when the totalizer is reset.

The general arrangement of the machine may be seen from Fig. 1. The four banks of keys 20 at the right of the machine are the amount keys. The next bank to the left, 21, is the special or transaction keys. The bank 22 at the extreme left is the operator's identifying keys. The drawer release key is located at 23. This key is shown at 24 in Fig. 9. The resetting key is indicated at 25, Fig. 1. This view also shows the location of the printer 26 and of a customer counter 27 which counts the number of times the machine is operated. The two center indicators 28 and 29 which are controlled by the initial and special keys are lettered so as to read both from the front and rear of the machine. The amount indicators 30 are in two sets, one of which reads from the front of the machine, and the other reads from the rear of the machine. The initial and special indicators are secured to larger pinions than are the amount indicators so that like movements of their respective operating segments will cause less peripheral movement of the initial and special indicators, as said indicators carry two sets of indications, while the amount indicators only carry one.

Each bank of keys and the totalizer segment which is controlled thereby are mounted upon castings 31 which may be easily removed from the machine or different ones inserted into the machine merely by the removal of the tie bars 32. (See Fig. 2.) Each of the castings 31 is formed with a rearwardly and downwardly extending arm to the rear end of which is pivotally mounted at 310 a totalizer actuating segment 34. The keys are slidably mounted on the castings 31 in an arc concentric to the pivotal point of the segment 34.

The totalizer 33, Fig. 6, is located directly above the totalizer actuating segments 34, Figs. 2 and 6.

*Keyboard.*—The banks of amount keys (Fig. 2) besides having the regular number of nine amount keys are each provided with a zero stop 35 which stop is for the purpose of preventing the totalizer segment from passing the zero position, during an operation of the machine, if no amount key has been depressed in the respective bank. When an amount key is depressed it engages one of the pins 36 which are riveted to a key detent 37 (Figs. 2 and 2A) and causes the detent to be rocked downwardly from the pivots 38 and 39 on which it is mounted by arms 52 and 53 so that the pin 40 which is carried by the detent 37 will engage an extension 41 of the zero stop 35 and rock the same out of the path of the extension 51 of the totalizer segment. The zero stop is pivoted to the casting 31 at 42 and is spring drawn into the path of the totalizer segment by the spring 43. When one of the keys is fully depressed the detent 37 springs slightly upward under the action of the spring 44 (Fig. 2A) so that the pin 36 will enter the notch 45 in the key and hold the same depressed against the action of the key spring 46. The arms 52 are provided with extensions 47 which when the detent is lowered through the depression of a key, pass before a rod 48 mounted between a pair of arms 49 rigid with the shaft 50 upon which the resetting key 25 is also mounted and will therefore prevent the depression of the resetting key when any of the amount keys are in their depressed position.

It is necessary to prevent depression of the resetting key when one of the amount keys is depressed because if it were possible to depress both at the same time the amount indicated by the amount key would not be added to the totalizer, nor would the totalizer always be properly reset. In a resetting operation the totalizer is backwardly rotated to its zero position by the totalizer actuating segments 34 during their forward stroke and the totalizer is held in its out of gear position during the return of the segments. It is during the return of the segments that the amount is ordinarily added to the totalizer and if one of the amount keys were in the path of the totalizer segment during its downward movement the segment might not reach its proper position to backwardly rotate its respective totalizer pinion to the required extent. The key detents 37 are mounted upon the arms 52 and 53 which extend from the pivots 38 and 39. The arm 52 is provided with the extension 47 mentioned above and the arm 53 is provided with an extension 54 which extends in under a rod 55 carried by arms 56 which are pivoted on the rod 58 carried by the main frame. One of the arms 56 is connected by a link 60 to the drawer latch 61 (see Figs. 9 and 9<sup>A</sup>) which is pivoted at 62 to the frame of the machine. This latch is engaged by the drawer when the drawer reaches its full closed position and rocks the latch 61 so that the rod 55, Fig. 2, will be forced against the extension 54 and so cause the detent 37 to be slightly lowered so that the pin 36 carried by the detent will permit the depressed key to return. The release of the keys is the last thing done during each operation of the machine and is accomplished by a slight overthrow of the drawer, when the same engages the drawer latch 61.

Each bank of keys is provided with a locking detent 63 (Figs. 2 and 2<sup>B</sup>) which is similar in form to the detent 37 but which carries a set of pins 64 which when the detent is operated, engage both the recesses 65 of the keys which are not depressed and the recesses 66 of the keys which are in depressed position and prevent movement of the keys. This detent is operated by the drawer release key so that as soon as the drawer release key is depressed, further adjustment of the keys will be prevented until the machine has been completely operated. The locking detent 63 is carried by a pair of arms 67 and 68 which are also pivoted at 38 and 39 the lower arm 68 being forked at 69 over a pin 70 which is carried by a bell crank lever 71 (see Fig. 9) which is pivoted at 72 to the frame of the machine and which is also connected by a link 73 to a spring actuated lever 74 which is pivoted at 75 to the frame. The drawer release key rocks the lever 74 upon its pivot 75 when the key is depressed through the spring 76 which connects the lever 74 with the shank 77 of the release key 24. This will cause the bell crank lever 71 to rock the rod 70 upwardly, thus moving the detent 63 upwardly so that the pins 64 will engage the notches in the keys and lock the same. The arm 74 is provided with an extension 78 which will prevent the return of the arm 74 when the drawer is open, as at this time, the rod 55 is rocked over the extension 78; but as soon as the drawer is fully closed the rod 55 will be swung opposite the recessed part 80 of the lever 74 and allow the same to be returned by the spring 81 which normally tends to draw the drawer release key to is outer position. The shank of the drawer release key 70 engages the pin 82 of the lever 74 and causes the same to return to its initial position with the key. When this occurs the bell-crank lever 71 will rock the rod 70 downwardly, as it is connected to the lever 74 by the link 73. The downward movement of the rod 70 will of course cause the locking detents 63 to become disengaged from the keys. The upper arms 67 to which the locking detents are pivoted are provided with extensions 84 which will move into the path of the rod 48 of the resetting key 25 and prevent depression of the resetting key when the locking detent is in its upper position which would be the case whenever the cash drawer is opened. However, the extension 84 is provided with a notch 85 which will not prevent the operation of the locking detent when the resetting key is depressed as it is also necessary to lock the keys against operation in resetting operations, and the notch also serves to retain the resetting key depressed during resetting operations.

*Differential mechanism.*—The differential mechanism is shown in Figs. 2, 3, 3<sup>A</sup>, 6 and 7. It comprises a segment, and indicator and type setting mechanism as shown in Fig. 3 for each bank of keys. The segments controlled by the amount keys are each provided with segment gears 87 (Fig. 6) which gears operate respective pinions 881 of the totalizer. All of the segments 34 are urged in a downward direction by springs 88 (see Fig. 3) but are normally prevented from such movement by the rod 89 which extends in under all of the segments. The rod 89 is lowered so as to permit movement of the segments, just after the cash drawer starts to its full open position, and such lowering of the rod 89 is accomplished by two cams 90 (see Fig. 8) which are provided with curved slots engaging rollers 91 carried by arms 92 which carry the rod 89. The arms 92 are pivoted at 93 to the side frames of the machine co-axially with the pivots of the segments 34. The cams 90 are oscillated by means of the main spring 94 (see Fig. 8) which spring draws downwardly upon the arm 95 which is pivoted at 96 and carries a roller 97 which roller bears upon a cam 98 which is rigid with the drive shaft 99 upon which the cams 90 are also rigidly mounted. The bearing of the roller upon the cam 98 causes the drive shaft 99 to be rocked in the direction indicated by the arrow 100, Fig. 8. The surface of the cam 98 upon which the roller 97 bears has such a curve that the speed of the drawer upon closing will be gradually increased if a uniform power is applied but if not, the last part of the closing movement of the drawer will be easier than the first part of the closing movement for the purpose of providing against failure to fully close the drawer. The arm 95 is limited in its downward movement by the stop 436 mounted on the frame of the machine. (Shown in section in Fig. 8). The spring 94 is prevented from operating until the cash drawer is released by the drawer arms 101, best shown in Fig. 9, which are pivoted at 102 and are connected by links 103 to levers 104 which are rigid upon the shaft 99. The spring 94 tends to rock the shaft 99 as explained and in doing so would draw down upon the drawer arms 101 through the links 103 and rock the same on their pivots 102 but this is prevented by the drawer, which bears against the lower parts of the drawer arms 101 when the drawer is closed.

When the drawer is released the spring 94 will force the drawer outwardly through the above mentioned mechanism and at the same time will rock the cam 90 upwardly, (Fig. 8). The shape of the slot in cam 90 is clearly such that by upward movement thereof the arms 92 will be gradually lowered until the drawer has nearly reached its outer position at which point the cam slot in the cam 90 is a circle struck from the center of the shaft 99 and therefore will have no effect upon the arms 92. It is here that the arms 92 are in their lowest position and the alining pawls 105, Fig. 3, are rocked into engagement with the racks 106 of the main segments 34 so as to lock the same. It is at this point before the drawer is fully opened or idly moving, that the indicators are set according to the extent of forward movement of the totalizer segments as controlled by the keyboard. The setting of the indicators is accomplished by the following mechanism. Each of the differential segments 34 have pivoted to their sides at 107 a beam 108 which is connected by means of a link 109 to its respective indicator segment 110 (see Fig. 5). All of the indicator segments 110 are locked while the segments 34 are in motion by means of the locking pawls 111. This being the case, when the segments 34 are moved downwardly the beams 108 will rock upon their pivots 112 according to the extent of movement of the segments. When the segments 34 have reached their lowered positions and are there locked, the indicator segment locking pawls 111 are moved out of engagement with the indicator alining teeth 113 of the indicator segments, this being accomplished by the cam 114 (see Fig. 5) which is mounted upon one of the drawer arms 101, and which cam engages a roller 115 upon an arm 116 when the drawer arms are rocked upon their pivots 102 so as to rock the arm upwardly. This arm is mounted at 117 upon the arm 118 which is loosely mounted upon the shaft 119 upon which the locking pawls 111 are rigidly mounted. Rigid with the shaft 119 is an arm 120 which carries a stud 121 extending into a slot 122 in the arm 118 so that when the arm 118 is rocked upwardly by the cam 114 bearing on the lower side of the roll 115 the stud 121 will be engaged by the edge of the slot 122 and the pawls 111 will be rocked out of engagement with the alining teeth 113 and will be held out of engagement during the latter part of the forward stroke of the cash drawer when the surface 123 of the cam 114 bears against the roller. When the drawer has reached its full open position, the roller 115 will drop below the point 124 of the cam 114 so that upon the return of the drawer the locking pawls 111 will be held in engagement with the alining teeth 113 by their springs 125.

Each of the indicator and printer operating beams 108, Fig. 3, carries a roller 126 which when the pawls 111 are out of engagement with the alining teeth 113 and the segments 34 are locked in their set positions, is acted upon by a V-shaped cam 127. The cam 127 is mounted upon the shaft 128, which shaft is oscillated during the latter portion of the outward movement of the cash drawer so that the cams 127 will move toward the rollers 126 and position the same by the cut 130 of the cam and in so doing will rock the end 112 of the beam 108 to a position which exactly corresponds to the difference between the extent of forward movement of the segment 34 and the position in which the roller 126 was left at the last previous operation of the machine. If the last position of the indicator had been zero the end 112 of the beam 108 would be rocked upwardly the same extent as the end 107 of the beam was rocked downwardly by the segment 34, but if the indicator had been left in some other position than zero, the end 112 of the beam would be rocked an extent and direction depending on the relative magnitudes of the previous setting of the indicator and the extent of forward movement of the segment. In all cases the roller 126 is brought to a constant position. A slotted cam 131 is rigidly mounted upon the shaft 128 upon which all of the cams 127 are also rigidly mounted. The cam 131 is engaged by a roller 132 which is carried by an arm 133 which arm is rigid with the main drive shaft 99 and is rocked upwardly when the drive shaft is oscillated upon the opening of the drawer. The lower part of the slot 134 in the cam 131 is a circle struck from the shaft 99 while the upper part of the slot 134 extends at an angle to the center of the shaft 99 so that the cam 131 does not become effective until the latter part of the opening stroke of the drawer at which times the segments 34 are properly locked and the indicator segments are free to be moved. The shaft 99 also carries a cam 136 which cam controls the operation of the alining pawls 105. This cam comprises two circular and an intermediate non-circular portion being thereby constructed so as to force the pawls 105 into engagement with the segments 34 when the segments have reached their forward positions, and hold them there during the remaining outward drawer movement. The cam 136 operates upon a bell crank lever 137 which is loose upon the shaft 128 and has its end 138 linked to a crank 139 which is rigid with the shaft 140 upon which the alining pawls 105 are also rigidly mounted.

*Totalizer.*—The totalizer is shown in Figs. 6, 7 and 8 and the mechanism for moving the totalizer into and out of mesh with the segments 87 of the differential mechanism is shown in Figs. 5, 8, 10 and 11. Between operations the totalizer remains in mesh with its actuating segments and in adding amounts the totalizer is moved out and held out of mesh with the segments 87 during their forward stroke and held in mesh with the segments during the return stroke, as it is upon the return stroke of the segments that the totalizer pinions are forwardly rotated. At other times, as, when one of the special keys such as the no sale, charge, or paid out keys are depressed it is desired to maintain the totalizer out of mesh with the segments during both the forward and return strokes thereof, so that the totalizer will not be affected in such operations.

In resetting the totalizer it is held in mesh with the segments during the forward stroke thereof so that the totalizer pinions will be backwardly rotated to their zero positions. Each of the totalizer pinions carries a pin which engages a pawl stop when the pinion reaches its zero position and is so prevented from passing beyond the zero position. This same stop is used for transferring from one pinion to another when amounts are being added to the totalizer when the totalizer is being rotated in a forward direction at which time the pins on the totalizer pinions engage inclined faces of the pawls and throw the pawls out of the paths of pins 150 on the segments of higher order. The transferring operation will be described in detail later.

There are four banks of amount keys shown on the keyboard, Fig. 1, but six pinions 881 are shown in the totalizer, Fig. 7. The two extra pinions are for the purpose of receiving transfers from the lower pinions. Transfers are accomplished by permitting the proper segment 87 to rotate its respective totalizer pinion an additional unit of movement at such times. For this reason six segments 87 with their companion segments 34 are provided, while only four of such segments are controlled directly by the keyboard.

Transfers are accomplished as follows: When one of the totalizer pinions 881 has made a complete rotation (or when it passes from the nine to the zero position) its pin trip 145 will engage the inclined surface 146 of its respective transfer pawl 147 and rock the same downwardly. The transfer pawls 147 have two arms one of which 148 is engaged by the pin on the totalizer pinion and the other arm 149 extends into the path of a pin 150 mounted upon the segment 87 of next high order. When the pawl is forced downwardly by being engaged by the pin on the totalizer pinion, the arm 149 passes below the pin 150 mounted on the next higher segment and permits said segment to rotate its respective counter pinion an additional unit of movement in a forward direction. The segment 87 is actuated in transferring operations by the spring 151 which spring is normally prevented from operating through the pin 150 abutting the end of the arm 149 of the transfer pawl. The arm 148 of the transfer pawl carries a pin 152 which when the transfer pawl is rocked downwardly in a transferring operation passes below the shoulder 153 upon the transfer pawl retaining arm 154 (see Figs. 6 and 8A). This arm 154 then springs forward under the action of its spring 155 so that the shoulder 153 will bear upon the pin 152 and prevent the return of the transfer pawl until the retaining arm 154 is rocked out of the path of the pin. This is done at the beginning of each operation of the machine and not at the end because sometimes the transfer is not turned in until the very last part of the operation of the machine. The object of the retaining pawl 154 is to insure the holding of the transfer pawl 147, after having been tripped, in its lower position until the segment 87 which is controlled thereby reaches the position where the pin 150 carried by said segment would strike the arm 149 of the transfer pawl if the arm 149 were in its upper position in case the said segment were also adding an amount to its respective counter pinion besides turning in a transfer to said pinion. Such of the retaining devices 154 as have been operated in transferring operations are returned to their normal positions at the beginning of the next operation of the machine by the rod 156 which extends in under all of the arms 157 of the retaining devices and which rod is rocked upwardly so as to engage the lower edges of the arms 157 at the beginning of each operation of the machine. The rod 156 is carried by a pair of arms 158 (see Fig. 8A) which are secured to a shaft 159 mounted on the side frames 160 of the totalizer. An arm 161 is also secured to the shaft 159 and is connected by a link 162 to a lever 163 which is pivoted to the frame of the totalizer at 164. The lever 163 carries a roller 165 at its lower end which is acted upon by the cam plate 167 which plate is pivoted at 102 to the side frame 168 (see Fig. 7). The cam plate 167 is forked over the pivotal connection 169 (see Fig. 8) between the drawer arm 101 and the link 103 so that when the drawer is open the cam plate 167 will rock downwardly upon its pivot 102. The slot 1671 in the cam plate then engages the roller 165 so causing the lever 163 to rock upon its pivot so that the rod 156 will be carried into engagement with the arms 157, Figs. 6 and 8$^A$, and raise the same so that the retaining pawls 154 will permit the transfer pawls 147 to return to normal position. The transfer pawls are returned to normal position by the springs 155 which are secured at one end to the transfer pawls and at their other ends to the arms 157, but the projection 425 of the retaining arm 154 engages a pin 426 which is mounted upon the transfer pawl and positively forces the pawl to its home position when the rod 156 engages the arm 157.

The totalizer itself is mounted upon the shaft 170 which shaft is carried by a pair of arms 171. (Figs. 6, 8 and 8$^B$). These arms are rigidly mounted upon the shaft 172 which shaft carries a pair of cam plates 173 and 174 (see Figs. 5, 7 and 10). The plate 173 is provided with a notch 175, and the plate 174 is provided with a notch 176. A forked member 177 carries a pair of studs 178 and 179, and may be shifted so that the studs carried thereby will either engage the notch 175 or the notch 176, when the lever is moved upwardly. If the lever is in such position that stud 178 engages the notch 175 when the lever is moved upwardly it will move the totalizer out of mesh with its actuating segments, while if the stud 179 engages the notch 176 when the fork 177 is moved upwardly the totalizer will be moved into mesh with its actuating segments. As in operations of addition it is necessary to have the totalizer out of mesh during the forward stroke of the segments and in mesh during the return, means are provided for moving the totalizer out of mesh at the beginning of each operation of the machine and for moving it into mesh at the middle of the operation when the drawer is in its outer position. This is accomplished as follows: The forked member 177 is pivoted to a bell crank lever 180 which lever is pivoted at 181 to the frame of the machine. (See Figs. 10 and 10$^B$). The bell crank lever 180 is connected by a link 182 to a similar bell crank lever 183. Each of the bell crank levers 180 and 183 carry rollers 184 and 185 respectively at their lower ends. The drawer arm 101 carries a camming pawl 186 which is so mounted on the arm 101 as to be free to rock in one direction while being prevented from rocking in the opposite direction so that when the drawer arm 101 is rocked forwardly upon the opening of the cash drawer the pawl 186 will engage the rollers 185 and 184 successively and rock their carrying bell cranks on their pivots but upon the return of the arm 101 the pawl 186 will idly rock over the rollers 184 and 185 without affecting the position of their carrying bell crank levers. The forked member 177 is normally held so that its stud 178 will engage the notch 175 as shown in Fig. 10 by the spring 440. In this position, when the drawer is opened the cam pawl 186 will bear down upon the roller 185 and rock the bell crank 183 accordingly, and the bell crank 183 through its link connection 182 to the bell crank 180 will rock the bell crank 180 so as to force the forked member 177 upwardly and move the totalizer out of mesh with its actuating segments. When the drawer is fully opened the camming pawl 186 engages the roller 184 and rocks the bell crank 180 so that the fork 177 will again be drawn downwardly and so move the totalizer into mesh, as the totalizer is carried by a pair of arms rigid with the shaft 172. This is the operation of the totalizer shifting device when amounts are being added to the totalizer, in which case it is necessary to have the totalizer in mesh during the return of the totalizer segments to zero positions upon the return of the cash drawer.

In case either of the no sale, charge, or paid out keys are depressed the totalizer should then be held out of mesh both during the forward stroke of the segment and during the return. When any of these keys are depressed the forked member 177 will be moved to a middle position where neither of the studs 178 and 179 which are carried by the fork will engage the notch 175 or 176 when the drawer reaches its open position so that the totalizer will then be left out of mesh with the actuating segments upon the return of the same. In such an operation the totalizer is first moved out of mesh as described in the case where amounts are added to the totalizer, but before the drawer reaches its open position, the fork is then shifted to its middle position. The shaft 140 upon which the totalizer segment alining pawls 105 are mounted carries an arm 190 (see Figs. 10 and 10$^A$) which arm carries the pawl 191 pivoted at 192 to the arm and also having pivoted thereto at 193 a link 194 which link connects the pawl to a lever 195 mounted upon a shaft 196. The shaft 196 also carries an arm 197 which arm is linked to the forked member 177 by a slotted link 198. The segment 34 which is controlled by the bank of special keys carries pins 199 which come to a stop in rear of pawl 191 when the segment 34 of the special bank reaches either of the positions at which it comes to rest, when either the no sale, charge, or paid out keys are depressed. When one of said pins is in such position and the shaft 140 is oscillated by means of the cam 136 (see Fig. 3) as described when the operation of the alining pawls 105 was explained, the arm 190 will be moved so that the end 200 of the pawl 191 engages one of the pins 199. The pawl 191 will then be rocked upon its pivot 192 so as to also rock the shaft 196 through the link 194 and lever 195. This will cause the lever 197 which is mounted upon the shaft 196 to draw upon the link 198 so as to pull the forked member 177 into its middle position. In this position of the forked member 177, when the drawer reaches its open position where the cam pawl 186 engages the roller 184, the lowering of the fork 177 at such time will not affect the position of the totalizer, the totalizer remaining out of mesh during the entire return of the totalizer segments, but is moved into mesh at the very last of the operation when the pin 4261 on the arm 101 engages the extension 4271 on the cam plate 174. The totalizer is left in mesh at the end of each operation and then if the next operation is a resetting, no change in the position of the totalizer will be necessary.

In resetting operations it is necessary to hold the totalizer in mesh during the forward stroke of the actuating segments so that the totalizer will be backwardly rotated to zero and then of course it is necessary to have the totalizer out of mesh during the return of the actuating segments. For this reason the resetting key 25 is arranged so that upon depression of the resetting key the forked member 177 will be shifted to the right so that the roll 179 will be moved into the notch 176 of the cam plate 174. The construction of the resetting key may be seen in Figs. 2 and 5. The shaft 50 upon which it is rigidly mounted carries a cam arm 202 which arm engages a roller 203, (Fig. 5,) on an arm 204 pivoted at 205, when the resetting key is depressed and rocks the arm backwardly, and in so doing the arm causes the forked member to also be rocked backwardly so that its roll 179 engages the notch 176 because of the link connection 207 between the arm 204 and the forked member 177.

As the transfer pawls 147 are not restored to normal position after being tripped by the pins 145 on the totalizer pinions until the beginning of the next operation of the machine when actuation of the members 157 restores the pawls, it is necessary to prevent resetting of the totalizer until the machine has been operated without adding an amount to the totalizer, merely for the purpose of restoring the transfer pawls which may have been tripped, because the transfer pawls must be in their untripped position in order to prevent the totalizer pinions from passing the zero position. As such idle operation of the machine for the purpose of restoring transfer pawls causes all of the indicators to be turned to zero, means are provided for preventing depression of the resetting key unless the amount indicators are all at zero, thereby compelling the desired idle operation.

If the indicators are all at zero the rod 427 (Fig. 5) will swing into the recesses 428 in the indicator segments while if any of the indicators are in other positions than zero, the rod 427 will bear against the surface 429 of such indicator segments. The rod 427 is carried by a pair of arms 430 which are pivoted at 205 and mounted rigid with the downwardly extending arm 431. When the indicators are all at zero, the rod 427 will be drawn into the recesses 428 by the spring 125 as shown in Fig. 5. In this position the stud 432 carried by the arm 431 holds the arm 204 in such position that the roller 203 may be acted upon by the cam 202 while if the rod 427 is moved out of the recesses 428 the arm 204 will swing forwardly under the action of the spring 433 so that the roller 203 will be moved opposite the non-camming part 434 of the cam arm 202 and so prevent depression of the resetting key 25 which is rigid with the arm 202 (Fig. 2).

The arms 171 which carry the totalizer shaft 170 are provided with a pair of notches 209 and 210 (Fig. 8ᴮ) into which notches rollers 211 enter when the totalizer is either in its unmeshed or meshed position and tend to hold the same in such positions. The rollers 211 are carried by spring pressed arms 212 (see Figs. 6, 7, and 8). The springs 213 which urge the rollers 211 into engaging position with the notches 209 and 210 are hooked over the rollers 211 on the arms 212 at one end and at their other ends are hooked over studs 214 carried by the arms 171. The arm 212 which is at the right hand side of the totalizer (see Fig. 8) has a downward extension 215 which coacts with a roller 216 carried by the cam plate 167 which operates to lock the rollers 211 in either of the notches 209 or 210 while the totalizer actuating segments are either being moved forwardly or returned so that the totalizer may not be shifted into or out of mesh with the segments except when the segments are either locked in their forward positions or held in their zero positions by the rod 89. The arm 212 (see Fig. 8) has pivoted at its side a link 217 which link connects the arm with a rod 218. This rod is carried by a number of counter alining pawls 219 (see Fig. 8ᴮ) which are loosely mounted upon the shaft 172. When the arms 212 are slightly moved away from the totalizer when the totalizer is being shifted because of the enlarged part 241 on the arms 171 between the recesses 209 and 210, the alining pawls 219 will be rocked into engagement with the totalizer pinions and will be moved away from the totalizer pinions when the roll 211 enters one of the recesses 209 or 210 but in case the totalizer is being moved out of mesh, the totalizer will follow the alining pawls 219 so as to be engaged with the same during its outward movement and remain engaged with the same in its upper position when it is entirely out of mesh with the actuating segments. In case the totalizer is being moved from its unmeshed position into its meshed position, the alining pawls 219 will follow the totalizer downwardly so as to mesh with the same until the totalizer pinions are meshed with the actuating segments, at which time the roll 211 enters the recess 210 when the pawls 219 will be moved out of mesh with the totalizer pinions because of the connection between the arms 212 which carry the roll 211 and the alining pawls 219. With this construction the totalizer is always either locked with the actuating racks or the alining pawls 219 and when it is being moved into or out of engagement with the actuating segments, the pawls 219 will follow the same until fully engaged or disengaged from the segments when the pawls may move to their uppermost position.

Fig. 12 shows a side elevation of the resetting key and of the key detents of the banks of special keys. One of the special keys must be depressed each time the machine is operated except in the case of resetting, when the resetting key serves to unlock the locking mechanism controlled by the banks of special keys. For this reason the banks of special keys are not provided with zero stops 35 as are the other banks of keys, as in the other banks when no key is depressed it is necessary to stop the respective segment for said bank at its zero position, but in the case of the special keys, the segment for each bank would always pass the zero position except in resetting the machine, in which case it is necessary to prevent the segment from passing the zero position. This is accomplished by a zero plunger 220 as shown in Fig. 12. This plunger is normally held out of the path of the segment for said bank by the spring 221 but when the resetting key 25 is depressed it is drawn into the path of the segment, so as to prevent it going beyond its zero position. The rod 48 which is carried by the arms 49 extending from the shaft 50 upon which the resetting key is mounted engages a lever 222 when the resetting key is depressed. The lever 222 is forked over a a pin 223 extending from the zero plunger 220 so that when the lever 222 is rocked upon its pivot 224 it will cause the zero plunger 220 to rock upon its pivot 225 into the path of the segment. The key detent 37 of the special keys is mounted similarly to the detents 37 of the other banks of keys. The lower arm upon which the detent is mounted has a locking extension 226 which hooks in under the rod 55 which is carried by the arms 56 and which arms are connected by the link 60 to the drawer latch 61 and will prevent the latch 61 from releasing the drawer when the locking extension 226 is in the path of the rod 55. The depression of any one of the special keys will lower the detent 37 so that the part 226 will be moved out of the path of the rod 55. The upper arm 227 upon which the detent is mounted has an extension which is cut at an incline to the path of the rod 48 so that when the resetting key is depressed the rod 48 will cam the arm 227 downwardly the same as when one of the special keys is depressed and also move the locking part 226 out of the path of the rod 55 so that when the drawer release key 24 is depressed the drawer may then open and the machine be operated until the resetting has been accomplished as described. The arm 226 carries a pin to which the spring 221 is fastened so that the spring 221 will serve the two purposes of normally holding the zero plunger 220 out of the path of the segment and also returning the detent 37 to its normal position after an operation. The locking detent 63 of the special bank operates the same as the locking detents for the other banks. The bank of initial keys also controls a locking member similar to the member 226 controlled by the bank of special keys, so that in order to operate the machine it is necessary to press one of the initial keys.

*Printing mechanism.*—The printing mechanism is shown in Figs. 1, 11 and 11ᴬ. Fig. 1 shows the printing mechanism in front elevation and Fig. 11 shows a side elevation of the printing mechanism looking from the right to left of Fig. 1. Fig. 4 is a rear elevation of the machine and shows a number of transverse shafts 228, one for each bank of keys, which are oscillated by means of the links 109 (see Fig. 3) when the rollers 126 on the beams 108 are engaged by the cams 127. The shafts 228 carry arms 229 which are pivoted at their outer ends to the links 109, and at the connection between the arms 229 and the links 109 a similar link 230 is pivoted and connecting the links 109 with the indicator segments 110 of the indicators which read from the front of the machine and also of the two special indicators 29 and 28 which read from the rear of the machine. Each of the shafts 228 has rigidly mounted thereon arms 331 which are similar to the arms 229. At the outer ends of the arms 331 are pivoted links 332 which are connected to the type-carrying segments 333 which are pivoted at 334 (see Fig. 11). By these means, the extent of oscillation of the different shafts 228 is communicated to the type segments so that the type segments will be set according to the movement of the differential mechanism as controlled at the keyboard. The indicator segments which operate the four amount indicators which read from the rear of the machine are connected to the respective shafts 228 which are controlled by the banks of amount keys by links 233 and levers 234 extending from the shafts 228.

Only one type segment 333 is shown in Fig. 11, but there is of course one for each bank of keys. The type segment 333 as shown in Fig. 11 is in its zero position and if the platen were operated while the segment is in this position zero would be printed, but if one of the keys is depressed and the machine operated the segment would be rocked to bring a higher number to the printing line through the link connections described, in accordance with the setting of its respective segment in the differential mechanism. The roller platen 336 is operated while the drawer is being returned to its inner position. The platen is carried by an arm 337 which is pivoted at 338 and is operated by a spring 339. The spring 339 normally urges the platen toward the type segment 333 and is tensioned by means of a lever 340 which is pivoted at 341 and carries a hook pawl 342 at its lower end. When the lever 340 is rocked in the direction of the arrow 343 the hook pawl 342 rides up over a pin 344 carried by the platen lever 337 and drops over the pin 344 so that on the return of the lever 340, the platen will be carried with it. Just before the lever 340 reaches its home position, a downward extension of the hook 342 engages a pin 346 extending from the frame 347 and causes the hook to release the platen so that the platen springs rearward and presses the detail tape 348 and ink ribbon 349 against the type which are at the printing position and so causes an impression to be made upon the detail strip 348. The lever 340 is operated by the main driving spring 94 through the lever 95 and link 350 which connects the lever 340 to the lever 95. The lever 340 is rocked in the direction of the arrow 343 upon the opening of the cash drawer and is returned upon the closing of the cash drawer. The force of the impact of the platen against the type may be regulated by the device 351 which is pivoted upon the rod 352 carrying the roll of detail paper 353. The device 351 may be set at a greater or less distance from the fulcrum of the lever 337 by means of the thumb screw 354 so that the lever 337 will compress the spring 355 a greater or less extent when the end 356 of the lever 337 strikes the spring pressed plunger 357 before the platen reaches the type.

To feed the detail strip the lever 340 carries a pawl 358 acting upon a ratchet 359 which is rigid with a receiving roll 360 for the detail strip so that each time the lever 340 is actuated it will cause the ratchet 359 and receiving roll 360 to be rotated a distance of one tooth space on the ratchet. A customer counter is actuated from lever 340 by the following mechanism: The lever 340 has a cam slot 361 cut into its upper end, operating upon a roller 362 carried by an arm 363 which is pivoted at 364 to a support 365 for the customer counter 366. The arm 363 carries a multi-pronged pawl 367, one prong for each denominational element in the counter. The prong of pawl 367 which operates upon the units counter pinion, actuates the units pinion each time the arm 363 is rocked. When it has rotated the units pinion to the nine position it drops part way into the deeper cut 368 in the ratchet 369 for the units pinion and allows the prong 370 of next higher order, which is shorter than the prong 370 of the units pawl, to engage its respective ratchet so that upon the next operation of the arm 363, when the units pawl causes its counter wheel to pass from nine to zero, the next higher pinion will be rotated from zero to one. This method of transfer continues according to the same number in the higher denominations and constitutes a well known "deep notch" transfer, the cuts 368 of the higher ratchet wheels being successively less in depth and the prongs 370 of the respective pawls for such ratchets also successively decreased in length. One of the retaining pawls for the ratchets 369 is shown at 371.

The ink ribbon 349 (Figs. 11 and 11ᴬ) is secured at its ends to drums 372 which are each provided with a ratchet 373. The shaft 374 upon which the upper drum is loosely mounted carries a lever 375 while the shaft 376 upon which the lower drum is loosely mounted carries an arm 377. The arms 375 and 377 are connected together by a link 378, carrying a pair of pawls 379 and 380. The pawl 379 is arranged to operate upon the upper ratchet and the pawl 380 on the lower ratchet but one or the other of these pawls is always held out of engagement according to whether the ribbon is being wound upon the upper drum or the lower drum. The position of the pawls is reversed whenever the ribbon is entirely unwound from one or the other of the drums. The arm 377 is connected by a link 381 to the cam 98 so that each time the machine is operated, the link 378 will be rocked upwardly and returned, driving whichever of the ratchets are engaged by the pawls 379 or 380. When the ribbon is completely unwound from one of the drums, one of a pair of levers 382 and 383 will enter into one of the notches 384 in the ink ribbon drums and by so doing will bring one of the lugs 385 into the path of extensions 386 of a link 387 which is carried by a pair of parallel levers 389, which are pivoted to the link 378.

The levers 382 and 383 are mounted upon the frame 347 at 390 and are urged toward their respective drums 372 by the spring 391 which connects the ends 392 of the levers 382 and 383. The levers 382 and 383 are held by the ribbon but when it is entirely unwound from one of the drums, the levers can then drop into the notches 384. When one of the levers does enter one of the notches 384 it will bring its respective lug 385 into the path of the corresponding extensions 386 of the link 387 so that when the link 378 is reciprocated, the link 387 will engage one of the lugs 385 and rock the levers 389 upon which it is pivoted upon their pivots 395. The levers 389 engage pins 396 upon the pawls 379 and 380 and will oppositely rock the pawls, the pawl which operates the drum from which the ribbon has been unwound being rocked into mesh with its ratchet while the other pawl is rocked out of mesh. The pawls are normally urged into engagement by the springs 397 but are controlled against the action of the springs 397 by the levers 389.

*Flash mechanism.*—The lever 120 which is rigidly secured to the shaft 119 (see Fig. 5) upon which the indicator alining pawls 111 are also mounted is arranged to operate the indicator flash mechanism at the same time that it actuates the indicator alining pawls so as to draw the indicator flash 407 down in front of the indicators when the indicators pawls 111 are disengaged from the alining teeth of the indicator segments and is retained in position covering the indicators until the indicators have been set and the alining pawls 111 are allowed to return into engagement. The lever 120 is connected by a link 402 to an arm 403 which is rigid upon the shaft 404. The shaft 404 also carries a pair of arms 405 upon which the flash arms are supported and which carry the indicator screens 407. By means of the link 402, the shaft 404 is caused to rock when the shaft 119 is rocked in order to disengage the alining pawls 111 from the teeth 113 and as the arms 405 are rigid with the shaft 404 they will draw the flash downwardly and so cover the indicators. When the alining pawls 111 are returned into engagement with the teeth 113, the flash will rise to its upper position, being drawn to such position by the spring 408 secured to an arm 411 rigid with the shaft 404, and is secured at its opposite end to a pin 409 which is fixed to the frame. The slotted connection between the link 402 and the lever 403 permits the alining pawls 111 to be drawn into engagement by their respective spring 401 independently of the rise of the flash. This is done to provide against possible inertia of the flash mechanism as it is important that nothing should prevent the alining pawls 111 from promptly engaging the alining teeth at the proper time.

*Drawer release.*—The drawer release key 24 (Fig. 9) performs two functions, i. e. control of the drawer latch 61 and control of the key locking detents 63 (see Figs. 2 and 2B). It is carried by the punching 77 (Fig. 9) which is hung from the arms 443 and 444 pivoted to the frame and is depressible against the action of the spring 81 so as to rock from the pivots of the arms 443 and 444. The drawer release key, controls the drawer latch 61 as follows: The lever 74 which is pivoted at 75 to the frame is connected at 82 to a pin on the drawer release key by a spring 76. Depression of the key 24 tensions the spring 76 so that the same will rock the lever 74 on its pivot 75 and the lever carries a locking extension 78 (Fig. 9B) which is normally in the path of the rod 55 but is rocked clear by the depression of the key 24. The rod 55 is carried by the pivoted arms 56 one of which is linked to the drawer latch by the link 60. When the extension 78 is rocked away from the rod 55 it will no longer prevent the drawer latch 61 from rocking upon its pivot 62 when the drawer is forced outwardly by the drive spring 94 (Fig. 8), the drawer latch and the arm 56 being linked together.

The key 24 controls the key locking detents 63 (Figs. 2 and 2B) through the rod 70 which passes through the fork 69 of the pivoted arms 68 which support the locking detent 63. The rod 70 is carried by bell crank levers 71, pivoted at 72, (Fig. 9B) which are connected to the lever 74 by the link 73. When the key 24 is depressed the rocking of the lever 74 causes the rod 70 to be lifted and thereby lift the detents 63 into locking position and likewise when the key 24 is released, the rod 70 will be lowered and so lower the detent 63 out of locking position. When the key 24 is depressed it is held in its depressed position until the drawer is closed by the rod 55 which engages the extension 78 so as to hold the lever 74 in its rocked position. The pin 82 which is carried by the lever 74 bears against the shank of the key 24 and prevents its return.

One of the most important advantages of construction of this machine is that it is built upon a sectional plan so that its capacity may be enlarged merely by the addition of extra banks of keys and differential mechanism for the banks, all of which are mounted in one frame, and of the corresponding indicators and such other minor parts as is necessary.

It will be evident from the drawings and the preceding description that the machine is designed to use parts of such shapes as may readily be stamped or punched out of sheet metal. This much reduces the cost of construction of the machine and is well adapted to insure accuracy of parts, and easy interchange of parts for repair.

The operation of the machine is as follows: A certain combination of keys must be depressed before the drawer can be opened, for instance, one of the initial keys, one of the special keys, and the drawer release key 24. The depression of one of the initial keys and one of the special keys will throw detents 226 out of the path of the rod 55 as shown in Fig. 12. So far as these banks are concerned, the drawer will then be free to open because the detents 226 will no longer prevent the oscillation of the drawer detent 61. Similarly when the drawer release key 24 is depressed the detent 78, Fig. 9, is moved out of the path of the rod 55 so that the link 60 which is pivoted to one of the arms which carries the rod 55 may rock the rod 55 backwardly being urged by the drive spring 94 (see Fig. 8) through the lever 95, cam 98, arm 104, link 103 and drawer arm 101, through the drawer 400 and drawer latch 61 to which the link 60 is pivoted. The drawer will now be opened through pressure from the drawer arm 101. As the drawer opens, the spring 94 contracts and rocks the shaft 99 so that the cam 90 will cause the lowering of the arms 92 and the rod 89 carried thereby. The segments 34 (see Figs. 2 and 3) will follow the rod 89 until stopped by the keys which are depressed. The segments are then locked in such positions by the pawls 105, Fig. 3, and the pawls 111, Fig. 5, are moved out of engagement with the alining teeth 113 of the indicator segments. The cams 127, Fig. 3, are now rocked rearwardly so as to engage the rollers 126 on the beams 108 and through them and the link connections with the indicator segments 110 position the indicators according to the extent of forward movement of each of the segments 34. When the pawls 111 are moved out of engagement with the alining teeth 113 of the indicator segments 110, the arm 120 mounted upon the same shaft with the pawls 111 is rocked against the action of the spring 401 drawing with a link 402 which rocks an arm 403 upon the shaft 404 and through it rocks a pair of arms 405 which draw down upon arms 406 which support the indicator screens or flash 407 so that the screens 407 will cover the indicators as seen through the openings in the cabinet while the indicators are being set to a different position. When the indicators are set the arm 116 drops down below the end 124 of the cam 114 and allows the alining pawls 111 to again mesh with the alining teeth 113 of the indicator segments, the spring 401 accomplishing this. The flash arms 406 will then be free to rise as they will not be held in their lower position by the link 402. The flash arms are urged upwardly by the spring 408 which extends from a stud 409, mounted upon one of the said frames to a stud 410 carried by an arm 411 rigid with the shaft 404. The link 402 has a slotted connection with the lever 403 so that the alining pawls may be promptly returned into engagement with the alining teeth 113 by the spring 401, independently of the rise of the flash, for the purpose of guarding against any lag in the engagement of the alining pawls 111 with the alining teeth 113 as might be the case of there were a fixed connection between the link 402 and the lever 403, as the alining pawls and the flash would then have to be returned together. The indicators will have been set before the cash drawer reaches its extreme open position and it is necessary to allow the cash drawer to fully open before the same may be closed because of the full stroke rack 413 which is engaged by a wiper pawl 414 on arm 101 held in engagement with the rack by the spring 415. The notches in the rack 413 permit the pawl 414 to be dragged over the notches, but if it is attempted to reverse the direction of movement of the pawl 414 before the same has reached the end of the rack 413, the part 416 will enter one of the notches in the rack 413 and will prevent further movement in such direction of the arm 101 which carries the pawl. The rack 413 is cut away at its ends enough to allow the pawl to rock to a vertical position when it may then be dragged back over the rack 413 as it was forwardly dragged over the rack. The cash drawer may now be returned to its inner position. Upon the return of the cash drawer the arms 92 are rocked upwardly by the cam 90, the rod 89 causing the return of the segments 34 to zero positions and so adding upon the totalizer the amount which was represented by the keys depressed and if any of the transfer pawls 147 have been tripped the segments 87 which are controlled by said transfer pawls will move up an additional step, thereby turning in the transfer to their respective totalizer pinions.

In the operation described, that is, the operation of adding an amount to the totalizer, the totalizer will be moved out of mesh with the actuating segments upon the starting of the opening of the cash drawer through the camming pawl 186 engaging the roller 185 on the bell crank 183, the bell crank 183 acting upon the link 182 and said link causing the rocking of a similar bell crank lever 180 upon which the forked member 177 is pivoted, the roller 178 of the forked member 177 engaging the notch 175 of the cam member 173 which is rigidly secured to the shaft 172. The shaft 172 also carries the arms 214 upon which the totalizer is carried and by being rocked to the right as described causes the totalizer to be unmeshed with the segments at the beginning of the opening of the cash drawer. When the cash drawer reaches its open position, the camming pawl 186 engages the roller 184 carried by the bell crank lever 180 and reversely operates the forked member 177 so that the totalizer will at this point be meshed with the actuating racks. Now upon the return of the drawer, the segments actuate the totalizer to add the proper amount thereon.

Each of the totalizer pinions carries a numbered drum 416, Fig. 7, as is common in the art and the arms 214 which carry the totalizer also carry a guard 217 which is provided with openings 218 through which the position of the totalizer drums may be seen and the total amount added thereon so read. The guard 217 is mounted upon the arms 214 so as to move with the totalizer when the same is meshed or unmeshed with the actuating racks, thus insuring that the proper numbers will appear opposite the openings 218 in the guard at both positions of the totalizer which might not be the case if the guard were mounted on an immovable part of the frame.

The printing upon the detail strip takes place when the indicators have been set and the drawer reaches its outer position. Before the full stroke pawl 414 (see Fig. 9) can pass the last notch in the rack 413, the drawer must be pushed inward slightly more than its normal inner position. In doing this the roller 420 mounted upon the end of the drawer engages the drawer latch 61 so as to rock the same slightly upon its pivot 62. In doing so it causes the link 60 to rock the levers 56 (see Fig. 2) against the extensions 54 of the arms upon which the key detents 37 are mounted and so causes the lowering of the key detents 37 so that their pins 36 will move out of the notches 45 in the keys which have been depressed and allow the same to return through the action of their springs 46. The rod 55 also acts upon the extensions 226 (see Fig. 12) of the key detents 37 of the special banks so as to release the depressed keys in the special banks. In the case of the drawer release key 24, Fig. 9, the key is returned under the action of its own spring 81 as soon as the rod 55 passes over the extension 78 of the lever 74 into the notch 80 in the extension 78.

If the drawer is returned without being overthrown beyond its normal inner position for the purpose of releasing the keys and causing the pawl 416 to pass the last notch in the full stroke device 413 as stated, and it is then attempted to open the drawer, the pawl 416 will engage the notch in the rack 413 and prevent forward movement of the drawer arm 101 and the drawer arm carries a pin 421 which will be engaged by an arm 422 which is secured to the shaft 62 and prevent the shaft 62 from being rocked enough to free the drawer from the latch 61. The construction makes it necessary to overthrow the drawer the required distance before the machine can again be operated or the drawer opened.

The totals may be read directly from the totalizer at any time, but if the totalizer is reset the total will also appear upon the indicators and be printed upon the detail strip except that in the particular construction shown in these drawings, the totalizer is of greater capacity than the indicators and there are also more totalizer pinions in the totalizer than type segments in the printer. The additional totalizer pinions shown are merely an extra precaution to provide for retaining total amounts when the total added to the totalizer surpasses the capacity of the indicators or printing segments. It is desirable, however, no matter what the capacity of the keyboard may be, to have a totalizer of somewhat greater capacity and additional indicators may be provided for such extra pinions in the totalizer and also type-carrying segments if desired because such indicators and segments can of course be operated by precisely the same mechanism as operates the indicators and type segments shown in the drawings, except that these indicators and type-segments would be rarely used because their use would be confined to resetting or total printing operations only.

The resetting of the totalizer is accomplished as follows: The machine is operated so as to reset the totalizer by merely depressing the resetting key 25, and the drawer release key 24. By the depression of the resetting key, the link 207, Fig. 5, is caused to force the forked member 177 into such position that the totalizer will be allowed to remain in mesh with the actuating racks during the forward stroke of the actuating racks and at the end of the forward stroke, the totalizer is moved out of mesh. This is exactly the reverse of the operation of the totalizer shifting mechanism in ordinary operations of the machine. Rearward movement of fork 177 around its pivotal connection with the bell crank 180 (Fig. 10) results in its roller 179 engaging the inclined edge 1741 of plate 174 and being cammed upwardly into notch 176. The upward movement of arm 177 rocks bell crank lever 180 counter clockwise thus causing the roller 174 on the bell crank lever to be positioned for engagement with cam 186 when the drawer levers 101 reach their forward position. This engagement will result in the downward movement of arm 177 and thus through roller 179 the totalizer supporting shaft 172 is rocked clockwise slightly to disengage the totalizer from the actuating segments after the same has been reset by the forward movement of the actuators.

The counter clockwise movement of bell crank lever 180 on the depression of the resetting key results in the counter clockwise rocking of bell crank lever 183 as the two bell cranks are connected by link 182. In this manner roller 185 is moved out of the path of cam 186 and therefore on resetting operations will not be engaged on the initial forward movement of drawer levers 101. The engagement of cam 186 with roller 184, through the bell cranks and link 182, causes the roller 185 to be repositioned into the path of movement of cam 186 so that when the drawer levers again move forward the totalizer shifting mechanism may operate in the usual manner. At the end of resetting operations the totalizer is reëngaged with the actuators by the engagement of roller 4261, on the drawer arm, with extension 4271 on plate 174. After this occurs the resetting key is released permitting spring 440 to rock the arm 177 forwardly to normal position as shown in Fig. 10 with its roller 178 engaging plate 173 at the notch 175.

As shown in Figs. 5 and 10 the openings in plates 173 and 174 are wide enough to permit positioning of arm 177 so that neither of its rollers 178 nor 179 engages the notch 175 or 176. The object of these wide openings in plates 173 and 174 is to provide for the entry of charge or paid out transactions without operating the totalizer as previously described, and also to permit if desired the making of arm 177 inoperative so that the totalizer may remain in mesh with the actuators both during their forward and return strokes, thus permitting the printing of subtotals. Means other than that controlled by the transaction keys for rocking arm 177 to an intermediate position are omitted from the present case, as such could be provided by duplicating the resetting key as shown, the only change required being one in length of the slot and link 207 (Fig. 5) to decrease the extent of rearward rocking of arm 177.

Upon the forward stroke of the segments the totalizer pinions are backwardly rotated until the pins 145 carried by the pinions reach such position that the totalizer will read zero through the openings 218 in the guard plate 217 at which position the pin strikes the inner surface of the lug 146 of the transfer pawl. The surface of the lug being radial to the shaft of the totalizer, the pin cannot force the transfer pawl downwardly, but it will be stopped in its zero position by the transfer pawl, at the same time preventing further forward movement on the part of the segments 34. The cams 127 are then operated while the segments are in their forward positions and cause the indicators to indicate the extent of such forward movement of the segments which exactly coincides with the total amount which has been added to the totalizer.

The type carriers are set simultaneously with the indicators and by means of the same mechanism with the addition of the links 332 which are pivoted to the type carrying segments and connect the same to the arms 331 which are mounted upon the shafts 228. The platen is operated to cause an impression of the total to be made upon the detail strip. The drawer is then returned and upon the end of its stroke all of the depressed keys are released and the machine is again ready to be regularly operated.

The mechanism has been described as operated by the cash drawer, but clearly other types of operating mechanism well known in the art may be employed. The pivoted pin 102 for the main lever serves the purpose of a crank center and in fact the arm 101 is in effect a crank pivoted at the center. Clearly said arm or crank 101 may be operated by hand as well as by the cash drawer and the invention is intended to include such a construction.

It will be seen from Fig. 1 that additional banks of keys may be inserted and the width of the space is so designed that a machine with any reasonable number of banks may be furnished using the same side frames and cross bars and other parts. This idea of providing any desired number of banks is rendered simple by the construction of a differential mechanism which, as previously stated, is all mounted on one casting supported from the center shaft of the machine whereby the banks of keys and their controlled mechanism may be added or taken out at will.

The automatic reverse device for the ink ribbon has the advantage that the reverse does not depend on an unusual tension being given to the ribbon. Many prior devices of this type did depend on such unusual tension, but such a construction is objectionable for the reason that it strains the ribbon greatly for the last four or five operations and the type or hammers hitting in practically the same place for several operations tend to wear the ribbon. With the present construction, however, there is no strain or pull on the ribbon at any time thereby giving a much better result.

In the preceding description it was stated that segment 34 corresponding to the special bank was operated at each operation of the machine, inasmuch as at every operation a key in each of these banks is depressed, so that the zero stop which is employed in connection with the amount banks, is not needed for these special banks. The zero position of the special segments 34 may therefore be employed to provide a printing device which will indicate when the total has been printed and this is the function of the zero arms 220, shown on Fig. 12. From the description of this figure it will be evident that arms 220 are only projected into the path of the stop pins 51 of the special segments 34 when the total key has been depressed, and will then be stopped at a position not attained in any other operation. At the corresponding position of the printing segments it is possible therefore, to place type indicating a resetting and total printing of the totalizer, and this type will be brought to printing position only when a total key is pressed. Any desired distinguishing mark may be employed such as a star or the letter T, and in fact it is practicable, as there are two of these segments, to place the letters "Re" on one and "set" on the other, so that the two taken together make up the word "Reset." Furthermore as at every other operation of the machine characters are set up by these two special segments 34 which print a clerk's letter and the character of sale, the indication of total printing may be made by cutting away of the type segments at the position brought to printing line when a total key is pressed, which, of course, would prevent the printing of any character at all, so that the indication that the totalizer has been reset, and total printing would be obtained by providing a printed amount having no distinguishing character whatever beside it.

While the form of mechanism herein shown and described is admirably adapted to fulfil the objects primarily stated, it is to be understood that it is not intended to confine the invention to the one form of embodiment herein disclosed for it is susceptible of embodiment in various forms all coming within the scope of the claims which follow.

What is claimed is as follows:

1. In an accounting machine, the combination with a segmental frame piece, of a bank of keys each carried by said frame piece, substantially radial to a point therein, and a differentially movable element pivoted to said frame piece at said point, and constructed to have its extent of movement controlled by said keys.

2. In a machine of the class described, the combination with an accounting device and means for operating it, of a transaction determining member, a pin located on said member, connections controlling the engagement of the accounting device with means for operating it, and means connected to and movable with said controlling connections and adapted to engage said pin in certain positions of adjustment of said transaction determining member whereby said connections will be disabled.

3. In an accounting machine, the combination with a bank of keys, of a detent plate for holding any adjusted key in actuated position and constructed to release any held key by actuation of any other key, of a differential element constructed to have its movement controlled by said keys, a zero stop normally preventing movement of said differential element but constructed to be released by said detent plate, a second plate adjacent said detent plate, a special release key having connections to actuate said second plate, said second plate being constructed to lock the keys in said bank upon the operation of said release key and to prevent an operation of the release key when one of the keys in said bank has been operated.

4. In an accounting machine, the combination with a cash drawer, and devices for holding said drawer in a position preventing access thereto and comprising a rocking frame including a rod, of a bank of keys, a plate operated by said keys, and connections from said plate preventing movement of said frame, and including a hooked arm, the hook of which normally engages said frame rod.

5. In an accounting machine, the combination with an accounting device and manipulative devices for determining the extent of operation thereof, of a detent plate for holding said manipulative devices in actuated position, a main operating device for the accounting device, connections controlled by said detent plate normally locking said main operating device, and a resetting key constructed to operate said detent plate, thereby releasing any manipulative device held in actuated position and also releasing said locking means for the main operating device.

6. In an accounting machine, the combination with printing devices of driving mechanism for the same, a bank of depressible keys for controlling the extent of movement of the driving mechanism, a zero stop for the driving mechanism normally out of the path of the driving mechanism, and a resetting key which when depressed causes the zero stop to be moved into the path of the driving mechanism.

7. In an accounting machine, the combination with printing devices of driving mechanism for the same, manipulative devices for controlling the extent of movement of the driving mechanism, a zero stop normally out of the path of the driving mechanism, and a resetting key which when depressed causes the stop to be moved into the path of the driving mechanism.

8. In an accounting machine, the combination with a bank of manipulative devices such as keys, of a plate constructed to lock said devices against movement, a cash drawer, a drawer latching mechanism, a special releasing key having connections to disable said latching mechanism, and devices, controlled by said key and constructed to move said locking plate into locking position, said locking plate being also adapted to prevent an operation of said special key when one of said manipulative devices has been operated.

9. In an accounting machine, the combination with accounting devices of driving mechanism for the same, means for differentially moving the driving mechanism, indicator mechanism, a beam connecting the indicator mechanism with the driving mechanism, means for preventing movement of the indicator mechanism while the driving mechanism is being moved so that the beam will merely rock upon its pivotal connection with the indicator mechanism at such time, a V-shaped cam arranged to be operated after the movement of the driving mechanism and to engage the beam so as to rock the same upon its pivotal connection with the driving mechanism in an opposite direction to which it was rocked upon movement of the driving mechanism so as to return a definite point of the beam to a zero position and thereby cause the indicator end of the beam to be positioned as much to one side of zero position as the end at the driving mechanism was moved to the other side of the zero position.

10. In an accounting machine, the combination with driving mechanism and means for differentially operating the same, of a totalizer, means for moving the totalizer into and out of mesh with the driving mechanism, transfer devices for the totalizer and means in the totalizer for tripping the same, retaining devices adapted to hold the transfer devices, when tripped, in tripped positions, a cam for releasing the transfer devices from the retaining devices which co-acts with the driving mechanism, said cam also acting when actuated to prevent the shift of the totalizer.

11. In an accounting machine, the combination with a keyboard of differential mechanism controlled thereby, indicator mechanism which is operated by the differential mechanism, indicator alining devices, means for disengaging the alining devices, and an indicator screen which is operated by said means.

12. In an accounting machine, the combination with accounting devices and means for operating the same, of a cash drawer, a spring for opening the drawer, means for stretching the spring by the closing of the drawer, a cam device for controlling said means so that less power will be required toward the last of the closing movement than at the beginning.

13. In an accounting machine, the combination with accounting devices of actuating mechanism for the same, driving mechanism, a cash drawer, with connections to operate the driving mechanism, manipulative devices for controlling the actuating mechanism, detents for the manipulative devices, means operative by an overthrow of the drawer for disengaging the detents from the manipulative devices, and a locking device which will prevent opening of the cash drawer until the same has been moved in farther than its normal inner position.

14. In an accounting machine, the combination with a totalizer of means for actuating the same, a bank of keys, differential mechanism controlled by the bank of keys, shifting means for moving the totalizer into and out of mesh with the actuating means, said shifting means arranged to be controlled by co-acting parts of the differential mechanism so that the position of the differential mechanism determines whether or not the totalizer will be held into or out of mesh with the totalizer actuating means.

15. In an accounting machine, the combination with a type carrier, and a hammer for taking impressions therefrom, of means for causing said hammer to strike the type carrier, and means for regulating the striking force of said hammer comprising; a pivoted plate, a spring controlled element mounted on said plate and in the path of a portion of the hammer-operating means, and means for holding said plate in any desired position.

16. In an accounting machine, the combination with a totalizer, a pivoted frame in which said totalizer is carried, and a plate fast to said frame and having a notch on one side of the frame pivot, of an arm having a projection for engaging said notch, means for oscillating said arm, a differentially movable element, pins constructed to be variably placed on said movable element, and devices positioned and constructed to engage said pins, with connections whereby said devices when so engaging may withdraw said projection from said notch.

17. In an accounting machine, the combination with movable parts thereof, of a cash drawer, connections from said cash drawer, to operate said movable parts, constructed to require a decreasing amount of power as the drawer nears its normal position, thus tending to cause an overthrow movement of said cash drawer, and connections from said cash drawer to actuate certain of said movable parts by said overthrow movement.

18. In an accounting machine, the combination with a totalizer of differential mechanism and means for controlling the same, printing elements arranged to be positioned by the differential mechanism and operated when the differential mechanism is in its moved position and means for locking the differential mechanism in its moved position while printing is being done.

19. In an accounting machine, the combination with accounting devices, of differential mechanism for the same, a bank of depressible keys for controlling the differential mechanism, locking detents for the keys which when actuated lock both the depressed and undepressed keys against movement, a cash drawer, a latch for the drawer, a key for releasing said latch, and connections from said releasing key for moving the locking detents to lock the depressible keys.

20. In an accounting machine, the combination with a key, and a detent operated by said key, of an arm supporting said detent, a total key, and means moved thereby positioned to move into the path of said arm and thereby prevent depression of said first key.

21. In an accounting machine, the combination with a key, and a detent operated by said key, of an arm supporting said detent, and a total key having a projection, said arm positioned and constructed to move into the path of said projection and thereby prevent depression of said total key.

22. In an accounting machine, the combination with a key, of a plate movable to lock said key in either depressed or undepressed position, a total key having a projection, an arm for supporting said plate and having a notch, said arm and notch being positioned to prevent operation of the total key after the locking movement of said plate, but to permit locking of said key whether the total key has been operated or not.

23. In an accounting machine, the combination with a differentially movable element and a zero stop normally in the path thereof, of a bank of keys, a detent for said keys constructed so that the depression of any key will release a previously depressed key, connections from said detent for withdrawing said zero stop from the path of said movable element, and a locking plate constructed to lock all the keys in said bank.

24. In an accounting machine, the combination with a totalizer and operating devices for same, of a bank of keys, a plate operated by said keys, a stop for said operating devices released by said plate, and a second plate with means for moving it to positively lock said keys in either depressed or undepressed position.

25. In an accounting machine, the combination with a totalizer and operating devices therefor, of a bank of keys, a stop for said operating devices, two plates adjacent said keys, one constructed to be operated by said keys to release said stop, with means for operating the other plate to positively lock said keys in either depressed or undepressed position.

26. In an accounting machine, the combination with an indicator and a link for operating it, of a beam connected to said link, a differentially movable device connected to said beam, and a V shaped cam for engaging a point on said beam and moving it to a constant position.

27. In an accounting machine, the combination with an indicator, and means for operating it including a beam, of differential devices for positioning one point on said beam, and a V shaped cam for engaging another point on said beam and returning said second point in either direction to a constant position.

28. In an accounting machine, the combination with an indicator, and means for operating it including a beam, of a differentially movable device for positioning one point on said beam, a V shaped cam for engaging a second point on said beam and restoring it to a constant position, a main operating device, and two cams each having a circular and a non-circular portion operated by a continued movement of said operating device, with connections whereby said movement first operates said differential device and then operates said V shaped cam.

29. In an accounting machine, the combination with an indicator and operating devices for same including a beam of a differentially adjustable device for positioning one point of said beam, means for adjusting another point of said beam to a constant position, a main operating device having a reciprocating movement, and cams operated by said main operating device and shaped to first position said differential device and then adjust said second point of the beam, during a continued movement of said main operating device.

30. In an accounting machine, the combination with a cash drawer and a device for retaining same in inaccessible position, of a plurality of latches for said retaining device, two keys controlling certain of said latches, a release key controlling another of said latches, and means whereby the operation of said release key locks both said other keys.

31. In an accounting machine, the combination with a cash safe having a movable part, and means for preventing exposure of said safe, of a plurality of latches for said preventing means, two independent keys, parts moved by said keys and serving when moved to release certain of said latches, a release key for releasing another of said latches, and connections whereby actuation of said release key locks said two keys against depression.

32. In an accounting machine, the combination with a cash safe having a movable part and means for preventing exposure of said safe, of two latches for said preventing means, a special key for releasing one of said latches, a special release key for releasing the other latch, and connections whereby actuation of said release key prevents depression of said first special key.

33. In an accounting machine, the combination with an operating mechanism and means normally preventing operation of same, of a plurality of latches for said preventing means, a special key for releasing one of said latches, a release key for releasing another of said latches, connections whereby actuation of said release key locks said special key, and connections whereby movement of said operating mechanism locks said release key.

34. In an accounting machine, the combination with an operating mechanism having means normally preventing actuation thereof, of a plurality of latches for said preventing means, a key, a plate operated by said key to release one of said latches, a release key having connections for releasing another of said latches, a plate operated by said release key to lock said first key, and connections whereby movement of said release key is prevented while said operating mechanism is out of normal position.

35. In an accounting machine, the combination with an operating mechanism, with means for preventing actuation of same, of latching means for said preventing means, a plurality of special keys, connections operated by said keys for partly releasing said latching means, a total key for also operating said connections, and a release key for also partly releasing said latching means.

36. In an accounting machine, the combination with a totalizer and means for operating it, of connections for shifting said totalizer into and out of operative relation to its operating means, a total key, devices for changing the time of operation of said connections, a cam having a locking notch, for operating said time changing devices, and itself operated by said total key, an indicator, and means controlled thereby for moving said time changing devices into and out of coöperation with said locking notch.

37. In an accounting machine, the combination with a totalizer and means for operating it, of connections for establishing an operative relation between said totalizer and its operating means, devices for changing the time of operation of said connections, a total key, and a cam having a locking notch and operated by said key for actuating said time changing connections, an indicator, and a bar controlled by the position of said indicator, for moving said time changing devices into and out of operative relation with said locking notch.

38. In an accounting machine, the combination with a totalizer and means for operating it, of connections for establishing operative relation between said operating devices and totalizer, a differentially movable device having a pin therein, an arm moved in a path intersecting that of said pin, and connections from said arm to said first mentioned connections to prevent operation of said totalizer.

39. In an accounting machine, the combination with a totalizer, and means for operating it, of connections for establishing an operative relation between said operating devices and totalizer, a differentially movable device having a projection, an arm moved at each operation in a path intersecting that of said projection, and a link and connections actuated when the projection is struck by said arm for shifting said connections and thereby preventing operation of said totalizer.

40. In an accounting machine, the combination with an accounting device, of an indicator, means for operating the accounting device and the indicator, devices for controlling resetting of said accounting device and connections from said indicator controlling the operativity of the resetting controlling devices.

41. In an accounting machine, the combination with an accounting device, of an actuator therefor including a member movable differentially, means for moving said member without operating the accounting device, and a V shaped cam for thereafter engaging said member and moving it to actuate the accounting device.

42. In a machine of the class described, the combination with an accounting device comprising a plurality of elements, of actuators for the accounting device, means for moving the accounting device into and out of operative relation with the actuators, and a guard movable with the accounting device and having sight openings through which the accounting device elements may be viewed.

43. In a machine of the class described, the combination with type carriers and means for differentially setting them, a spring driven platen for taking impressions from the type carriers, means for actuating the platen to store power in the spring, and independent means adjustable to neutralize to different degrees the power so stored in the spring when the spring is released.

44. In an accounting machine, the combination with an accounting device, of a differentially movable actuator therefor, means for imparting movement to said actuator, a totalizer, transfer devices controlled by the totalizer for controlling one unit of movement of said actuator, and means for positively restoring the transfer devices to normal position after a transferring operation.

45. In an accounting machine, the combination with a totalizer and actuators for differentially operating the same, of means for moving the totalizer into and out of mesh with the actuating devices, means for preventing movement of the totalizer into and out of mesh with the actuating devices, a cam for controlling said means, and mechanism for driving the differential actuators and said cam.

46. In an accounting machine, the combination with a totalizer and operating devices therefor, of a frame carrying said totalizer and movable to engage and disengage said totalizer and said operating devices, an arm having a bifurcated portion and means for giving said arm excursions of invariable extents, connections whereby said arm may operate said totalizer carrying frame, and a differentially movable element having connections to shift said arm at an angle to the line of its excursions.

47. In an accounting machine, the combination with two manipulative devices such as keys, of plates operated by said keys, a part, movable with one of said plates, having an obstructing edge, a second part, movable with the other of said plates, having an obstructing edge and a notch, a resetting key, and a bar operated by said key and positioned to engage said obstructing edges or to be held in said notch.

48. In an accounting machine, the combination with a manipulative device, such as a key, and a plate operated thereby, having an obstructing edge and a notch, of a resetting key, and a bar operated thereby, positioned to be blocked by said obstructing edge if attempt is made to operate the resetting key after the manipulative device has been operated, and to be held by said notch if the manipulative device is operated after the resetting key.

49. In an accounting machine, the combination with a segmental frame piece, of a bank of keys each carried by said frame piece substantially radial to a point therein, a differentially movable element pivoted to said frame piece at said point and constructed to have its extent of movement controlled by said keys, a main operating device, and means controlled thereby for actuating said movable element to said controlled extent.

50. In an accounting machine, the combination with a segmental frame piece, of a bank of keys each carried by said frame piece substantially radial to a point therein, a differentially movable element pivoted to said frame piece at said point and constructed to have its extent of movement controlled by said keys, a main operating device, means controlled thereby for actuating said movable element to said controlled extent, and means for detachably securing said segmental frame piece within the machine whereby said frame piece may be removed from the machine independent of all other mechanisms and devices contained therein.

51. In a machine of the class described, the combination with an accounting device and means for operating it, a main operating device, connections intermediate said devices for controlling the engagement of the accounting device with the means for operating it, an adjustable transaction determining member, and a pin on said member for disabling said connections when said transaction determining member is in certain positions of adjustment.

52. In a machine of the class described, the combination with an accounting device and means for operating it, a main operating device, connections intermediate said devices for controlling the engagement of the accounting device with the means for operating it, an adjustable transaction determining member, and a pin on said member for engaging and disabling said connections when said transaction determining member is in certain positions of adjustment whereby said engagement of the accounting device with its operating means is prevented upon the operation of said main operating device.

53. In a machine of the class described, the combination with a main operating mechanism, of a driving device therefor having a reciprocating movement; indicating devices carrying a plurality of insignia and movable back and forth for display of same severally, differentially adjustable elements having a normal starting point, said elements being differentially adjusted during movement of the driving device in one direction and restored to normal during movement of the driving device in the opposite direction, and connections between the differentially adjustable elements and the indicating devices arranged to be operated upon by the main operating mechanism during movement of its driving device in the first mentioned direction whereby to move the indicating devices directly from one indicating position to another without a return movement to a normal starting point.

54. In a machine of the class described, the combination with a main operating mechanism, of a driving device therefor having a reciprocating movement, indicating devices carrying a plurality of indicia and movable back and forth for display of same severally, a totalizer, actuators for the totalizer, said actuators being differentially adjusted during movement of the driving device in one direction and restored to zero whereby to operate the totalizer during movement of the driving device in the opposite direction, and connections between the actuators and the indicating devices arranged to be operated upon by the main operating mechanism during movement of its driving device in the first mentioned direction whereby to move the indicating devices directly from one indicating position to another without a return movement to a normal starting point.

55. In a machine of the class described, the combination with an indicating device carrying a plurality of insignia and movable back and forth for display of same severally; of manipulative means movable independently of the indicating device for determining the particular insignia to be displayed in an operation of the machine, a main operating mechanism having a reciprocating movement, and means for adjusting the indicating device directly from one indicating position to another during movement of the main operating mechanism in one direction, said indicating device remaining undisturbed in the indicating position during movement of the operating mechanism in the opposite direction.

56. In a machine of the class described, the combination with a main driving device having a reciprocating movement, of a bank of keys, indicating means carrying indicia representing the various keys, means controlled by the keys for operating the indicating means during movement of the driving device in one direction, said operating means being arranged to move the indicating means directly from one indicating position to another without a return movement to a normal starting point.

57. In a machine of the class described, the combination with a main driving device having a reciprocating movement, of manipulative devices, indicating devices comprising means carrying a plurality of indicia, means controlled by the manipulative devices for operating the indicating means during movement of the driving device in one direction, said operating means being arranged to move the carrying means for the indicia directly from one indicating position to another without a return movement to a normal starting point.

58. In a machine of the class described, the combination with a cash drawer, of an indicating device carrying a plurality of insignia and movable back and forth for display of the same severally, and means controlled by the cash drawer for operating the indicating device, said operating means being arranged to move the indicating device directly from one indicating position to another without a return movement to a normal starting point.

59. In a machine of the class described, the combination with a totalizer, of differential mechanism and means for controlling same, indicators, means controlled by the differential mechanism for moving the indicators directly from one indicating position to another while the differential mechanism is in its moved position, means for locking the differential mechanism in its moved position while the indicators are being positioned, and means for locking the indicators in their moved positions while the differential mechanism is driving the totalizer.

60. In a machine of the class described, the combination with a main driving device having a reciprocating movement, of a differentially movable actuator, a totalizer element, an indicator, means for differentially adjusting the actuator, means for setting the indicator in accordance with the adjusted position of the actuator while the actuator is stationary at said position, the adjustment of the actuator and setting of the indicator being performed during movement of the driving device in one direction, and means effective while the driving device is moving in the opposite direction for restoring the actuators to zero whereby to actuate the totalizer element.

61. In a machine of the class described, the combination with indicators, of a totalizer, totalizer actuators, manipulative devices, means for differentially adjusting the actuators under the control of the manipulative devices to set up on said actuators amounts to be indicated and entered in the totalizer, mechanism controlled by the actuators for setting the indicators while the actuators are stationary to show the amount set up on the actuators, and means for restoring the actuators to zero whereby to operate the totalizer, said mechanism being arranged to permit restoring the actuators without disturbing the indicators.

62. In a machine of the class described, the combination with a totalizer, of actuators therefor having a normal starting point, manipulatively controlled means for differentially adjusting the actuators to set up thereon amounts to be entered in the totalizer, indicators, means for setting the indicators in accordance with the adjusted positions of the actuators while the actuators are stationary, and means for restoring the actuators to normal whereby to actuate the totalizer.

63. In a machine of the class described, the combination with a totalizer, of actuators therefor, manipulative means for controlling the adjustment of the actuators to set up thereon items to be entered in the totalizer, indicators, means controlled by the actuators for setting the indicators while the actuators are stationary in their adjusted positions, and means for restoring the actuators to their zero positions whereby to actuate the totalizer.

64. In a machine of the class described, the combination with a totalizer, of actuators therefor, depressible keys, means for differentially positioning the actuators in accordance with the keys depressed, indicators, means controlled by the actuators for adjusting the indicators in accordance with the positions of the actuators after the actuators are positioned, and means for restoring the actuators to zero whereby to actuate the totalizer.

65. In a machine of the class described, the combination with a totalizer, of actuators therefor, manipulative devices, means for differentially setting the actuators under the control of the manipulative devices, indicators, connections whereby differentially setting the actuators predetermines the positions to which the indicators are to be subsequently adjusted, means for operating the connections to move the indicators from their previously adjusted positions without a return movement to a normal starting point, and means for restoring the actuators to zero whereby to actuate the totalizer.

66. In a machine of the class described, the combination with a totalizer, of actuators therefor, manipulative devices, means for differentially adjusting the actuators under the control of either the totalizer or the manipulative devices, indicators, and means controlled by the actuators for setting the indicators while said actuators are stationary in their differentially adjustable positions.

67. In a machine of the class described, the combination with a totalizer, of actuators therefor, a plurality of keys, means for differentially adjusting the actuators under the control of either the keys or the totalizer, and means controlled by the actuators for setting the indicators while the actuators are stationary in their differentially adjusted positions.

68. In a machine of the class described, the combination with a totalizer, of actuators therefor, manipulative devices, means for differentially adjusting the actuators under the control of either the totalizer or the manipulative devices, and means controlled by the actuators for setting the indicators while the actuators are in adjusted position, said setting means being arranged invariably to move the indicators directly from one position to another.

69. In a machine of the class described, the combination with a totalizer, of actuators therefor, a plurality of keys, means for differentially adjusting the actuators under the control of either the keys or the totalizer, and means controlled by the actuators for setting the indicators while the actuators are in adjusted position, said means being arranged invariably to move the indicators directly from one position to another.

In testimony whereof we affix our signatures in the presence of two witnesses.

CHARLES F. KETTERING.
WILLIAM A. CHRYST.

Witnesses:
 FRED E. HAMILTON,
 RUDOW RUMMLER.